(12) United States Patent
Kaminaka et al.

(10) Patent No.: US 9,680,162 B2
(45) Date of Patent: *Jun. 13, 2017

(54) STAINLESS STEEL SHEET FOR A SEPARATOR FOR A SOLID POLYMER FUEL CELL AND A SOLID POLYMER FUEL CELL EMPLOYING THE SEPARATOR

(75) Inventors: Hideya Kaminaka, Nishinomiya (JP); Junko Imamura, Amagasaki (JP); Akira Seki, Ashiya (JP); Kouichi Takeuchi, Chofu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 713 days.

This patent is subject to a terminal disclaimer.

(21) Appl. No.: 13/080,937

(22) Filed: Apr. 6, 2011

(65) Prior Publication Data

US 2011/0250522 A1 Oct. 13, 2011

Related U.S. Application Data

(63) Continuation of application No. PCT/JP2009/067512, filed on Oct. 7, 2009.

(30) Foreign Application Priority Data

| Oct. 7, 2008 | (JP) | 2008-260873 |
| Nov. 14, 2008 | (JP) | 2008-292367 |
| Oct. 7, 2009 | (JP) | 2009-233511 |

(51) Int. Cl.
*H01M 8/021* (2016.01)
*C22C 38/40* (2006.01)
(Continued)

(52) U.S. Cl.
CPC ............. *H01M 8/021* (2013.01); *C22C 38/40* (2013.01); *C22C 38/44* (2013.01);
(Continued)

(58) Field of Classification Search
None
See application file for complete search history.

(56) References Cited

U.S. PATENT DOCUMENTS 5,789,086 A * 8/1998 Ohmi ................. C23C 8/14
148/280
6,420,070 B1 * 7/2002 Kasamatsu et al. ....... 429/231.8
(Continued)

FOREIGN PATENT DOCUMENTS

| CN | 1271027 | 10/2005 |
| EP | 1 094 535 | 4/2001 |

(Continued)

OTHER PUBLICATIONS

"Interlayer interactions in graphite and carbon nanotubes" by Palser et al, Phys. Chem. Chem. Phys. (1999) 1:4459-4464.*

(Continued)

*Primary Examiner* — Patrick Ryan
*Assistant Examiner* — Carmen Lyles-Irving
(74) *Attorney, Agent, or Firm* — Clark & Brody

(57) ABSTRACT

A stainless steel member for a separator of a solid polymer fuel cell has excellent cell properties with little deterioration in performance over long periods of operation without worsening of the corrosion resistance of a stainless steel separator. The stainless steel member has a stainless steel base metal, and a passive film and electrically conductive precipitates both provided on a surface of the stainless steel base metal. The electrically conductive precipitate penetrates the passive film and includes a substance originating from the stainless steel base metal. An electrically conductive layer comprising a nonmetallic electrically conductive substance is preferably provided on the surface of the passive film, and the electrically conductive layer is prefer- (Continued)

ably electrically connected to the stainless steel base member through the electrically conductive precipitates.

11 Claims, 5 Drawing Sheets

(51) Int. Cl.
| | | |
|---|---|---|
| *C22C 38/44* | (2006.01) | |
| *H01M 8/0226* | (2016.01) | |
| *H01M 8/0228* | (2016.01) | |
| *H01M 2/14* | (2006.01) | |
| *H01M 8/10* | (2016.01) | |
| *H01M 8/1018* | (2016.01) | |

(52) U.S. Cl.
CPC ....... *H01M 8/0226* (2013.01); *H01M 8/0228* (2013.01); *H01M 2/14* (2013.01); *H01M 8/10* (2013.01); *H01M 2008/1095* (2013.01)

(56) References Cited

U.S. PATENT DOCUMENTS

| | | | |
|---|---|---|---|
| 6,884,363 B2* | 4/2005 | Ohtani et al. | 216/6 |
| 7,254,887 B2* | 8/2007 | Ishigami et al. | 29/825 |
| 7,325,432 B2* | 2/2008 | Ohtani et al. | 72/340 |
| 2003/0116536 A1* | 6/2003 | Ohtani et al. | 216/86 |
| 2005/0037212 A1 | 2/2005 | Budinski | |
| 2005/0051431 A1* | 3/2005 | Ohtani et al. | 205/57 |
| 2005/0089742 A1* | 4/2005 | Ishigami et al. | 429/34 |
| 2007/0178349 A1* | 8/2007 | Iino et al. | 429/34 |
| 2008/0050635 A1* | 2/2008 | Gao et al. | 429/34 |
| 2008/0160390 A1* | 7/2008 | Nakata | 429/34 |
| 2008/0233456 A1* | 9/2008 | Ishikawa | C22C 38/001 429/492 |

FOREIGN PATENT DOCUMENTS

| | | |
|---|---|---|
| EP | 1 235 288 | 8/2002 |
| EP | 1 326 297 | 7/2003 |
| EP | 1 726 674 | 11/2006 |
| JP | 10-228914 | 8/1998 |
| JP | 11-121018 | 4/1999 |
| JP | 11-260382 | 9/1999 |
| JP | 11-345618 | 12/1999 |
| JP | 2000-067881 | 3/2000 |
| JP | 2000-323152 | 11/2000 |
| JP | 2001-032056 * | 2/2001 |
| JP | 2001-214286 | 8/2001 |
| JP | 2002-042828 | 2/2002 |
| JP | 3365385 | 11/2002 |
| JP | 2004-124197 | 4/2004 |
| JP | 2004-269969 | 9/2004 |
| JP | 2005-243595 | 9/2005 |
| JP | 2007-031233 | 2/2007 |
| KR | 10-0777123 | 11/2007 |
| WO | 99/19927 | 4/1999 |
| WO | 00/01025 | 1/2000 |
| WO | 01/18895 | 3/2001 |
| WO | 02/23654 | 3/2002 |
| WO | 03/044888 | 5/2003 |
| WO | 2008/082162 | 7/2008 |

OTHER PUBLICATIONS

"Preparation and characterization of nanocystalline chromium boride" by Qin et al., J. Mater. Sci (2006) 41:7617-7619.*

"A review on the mechanical and electrical properties of graphite and modified graphite reinforced polymer composites" by Sengupta et al, Progress in Polymer Science (2011) 36:638-670.*

"Phase stability and Mechanical Properties of Carbide and Boride Strengthened Chromium-based Alloys" by Filippi, Metallurgical Transactions (1972) 3: 1727-1733.*

"Microstructures and mechanical properties of boride-dispersed precipitation-hardening stainless steel produced by RST" by Hahn et al., J. of Material Sci. (1987) 22:3395-3401.*

"Corrosion behavior of a steel surface laser alloyed with chromium borides" by Zuo et al., J. of Material Sci. (1992) 27:3014-3020.*

"The Electrical Properties of Chromium Borides, Carbides, and Nitrides" by :L'vov et al., Soviet Powder Metallurgy and Metals (1962) 1(4):243-247.*

Machine translation of JP 2001-032056 by Yoshio et al.*

T. H. O'Dell, "Observation of the Magneto-electric Effect in Polycrystalline Chromium Oxide", Philosophical Magazine, vol. 10, Issue 107, pp. 800-902, Jun. 1, 1964 (published online Aug. 20, 2006).*

* cited by examiner (1)

(2)

(3)

Surface roughening
→Precipitation treatment
of electrically conductive smut

Sliding adhesion treatment

Improvement of charge collection
due to orientation

STAINLESS STEEL SHEET FOR A SEPARATOR FOR A SOLID POLYMER FUEL CELL AND A SOLID POLYMER FUEL CELL EMPLOYING THE SEPARATOR

TECHNICAL FIELD

This invention relates to a solid polymer fuel cell and a stainless steel member for a separator, which is a component of the fuel cell.

BACKGROUND ART

A fuel cell utilizes energy generated at the time of a reaction combining hydrogen and oxygen. Fuel cells are expected to be installed and widely used as the next generation of electrical generating systems from the standpoints of energy conservation and the environment. There are a number of types of fuel cell, including solid electrolyte types, molten carbonate types, phosphoric acid types, and solid polymer types.

Among these types, solid polymer fuel cells have a high output density and can be made small, and they are easy to start and stop because they operate at a lower temperature than other types of fuel cells. Therefore, solid polymer fuel cells have attracted particular attention in recent years for use in small cogeneration systems in electric vehicles or for household use.

FIG. 1 shows the structure of a solid polymer fuel cell (referred to below simply as a fuel cell). FIG. 1(*a*) is an exploded view of a unit cell constituting a fuel cell, and FIG. 1(*b*) is a perspective view of an entire fuel cell formed by combining a large number of unit cells.

As shown in FIG. 1, a fuel cell 1 is a stack of unit cells. As shown in FIG. 1(*a*), a unit cell has a solid polymer electrolyte film 2, gas diffusion electrode layer 3 which functions as a negative electrode of the cell (also referred to as a fuel electrode film and referred to below as the anode) on one surface of the solid polymer electrolyte film 2, a gas diffusion electrode layer 4 which functions as a positive electrode of the cell (also referred to as an oxidant electrode film and referred to below as the cathode) on the other surface of the solid polymer electrolyte film 2, and separators (bipolar plates) 5*a* and 5*b* are stacked on both surfaces of the unit cell.

Some fuel cells are water-cooled fuel cells in which water-cooled separators having flow paths for cooling water are disposed between the above-described unit cells or between every several unit cells. The present invention also relates to a water-cooled fuel cell.

The solid polymer electrolyte film 2 (referred to below simply as an electrolyte film) comprises a fluorine-based proton-conducting film having a hydrogen ion (proton) exchange group. The anode 3 and the cathode 4 have a particulate platinum catalyst and graphite powder provided thereon, and if necessary, they may have a catalyst layer comprising a fluororesin having a hydrogen ion (proton) exchange group.

In this case, a reaction is promoted by contacting the catalyst layer with a fuel gas or an oxidizing gas.

Fuel gas A (hydrogen or a hydrogen-containing gas) is made to flow from passages 6*a* provided in the separator 5*a* to supply hydrogen to the fuel electrode film 3. An oxidizing gas B such as air is made to flow from passages 6*b* provided in separator 5*b* to supply oxygen. An electrochemical reaction is produced by the supplied gases to generate direct current electric power.

The primary functions demanded of a separator for a solid polymer fuel cell are as follows:

(1) a function as a passage uniformly supplying a fuel gas and an oxidizing gas to the interior surfaces of the cell, (2) a function as a passage which efficiently discharges water produced on the cathode side and carrier gases such as air and oxygen after reaction from the fuel cell to the exterior, (3) a function as an electrical connector which contacts the electrode films (anode 3 and cathode 4) and provides a conductive path between unit cells, (4) a function as a partition between the anode chamber of one unit cell and the cathode chamber of the adjoining unit cell, and (5) in a water-cooled fuel cell, a function as a partition between cooling water passages and the adjoining cell.

Materials for use as a substrate of a separator used in a solid polymer fuel cell (referred to below simply as a separator) which needs to perform these functions can be roughly divided into metallic materials and carbonaceous materials.

Separators made of metallic materials such as stainless steel, Ti, and carbon steel are manufactured by methods such as press forming. On the other hand, a plurality of methods are used for the manufacture of separators made of carbonaceous materials. Examples of such methods are a method in which a graphite substrate is impregnated with a thermosetting resin such as a phenolic or furan resin and cured and then baked, and a method in which carbon powder is kneaded with a phenolic resin, a furan resin, or tar pitch, the kneaded mixture is press formed or injected molded into the shape of a sheet, and the resulting material is baked and formed into vitreous carbon.

Metallic materials such as stainless steel have advantages such as the excellent workability which is characteristic of metals, as a result of which the thickness of a separator can be reduced, and a light-weight separator can be achieved. However, the electrical conductivity may be decreased due to elution of metal ions by corrosion or oxidation of the metal surface. Therefore, a separator made of a metallic material (referred to below as a metal separator) has the problem that the contact resistance between the separator and a gas diffusion electrode layer (referred to below for short as contact resistance) may increase.

On the other hand, carbonaceous materials have the advantage that a lightweight separator can be obtained. However, they had the problems that they were gas permeable and had low mechanical strength.

As one method of solving the above-described problems of metal separators, as disclosed in Patent Document 1, it has been proposed to perform gold plating on the surface of the substrate of a metal separator which contacts an electrode. However, using a large amount of gold in fuel cells for vehicles such as automobiles and stationary fuel cells is problematic from the standpoints of economy and quantitative restrictions on resources.

Therefore, it has been proposed to coat the surface of a metal separator with carbon as one attempt to solve the above-described problems without using gold.

The following techniques have been proposed as methods of covering the surface of a metal separator with carbon.

(A) A painted metal separator material for a solid polymer fuel cell disclosed in Patent Document 2 comprises an austenitic stainless steel member with a surface which has undergone pickling and an electrically conductive paint having a thickness of 3 to 20 micrometers on the pickled surface. The electrically conductive material inside the paint is a mixed powder of graphite powder and carbon black.

That patent document discloses a process in which the surface of a substrate of a metal separator is pickled, and after pickling, the surface of the substrate is coated with an electrically conductive paint containing carbon.

(B) A paint for a fuel cell separator disclosed in Patent Document 3 uses graphite as an electrically conductive material. The paint is applied to the surface of a metal or carbon substrate of a separator for a fuel cell to form an electrically conductive coating. The paint contains a binder consisting of at least 10 percent by weight of a copolymer (VDF-HFP copolymer) of vinylidene fluoride (VDF) and hexafluoropropylene (HFP), and an organic solvent which is miscible with the binder is used as a solvent. The ratio by weight of the electrically conductive material to the binder is 15:85 to 90:10, and the proportion of the organic solvent in the paint is 50 to 95 percent by weight.

Similar to Patent Document 3, Patent Document 8 discloses an electrically conductive separator in which an electrically conductive resin layer comprising a resin having a water repellant or basic group and electrically conductive particles is provided atop a metal substrate.

(C) Patent Document 4 discloses a separator for a fuel cell, the separator acting together with plate-shaped electrodes of unit cells to form a gas flow path. The separator comprises a metal sheet of low electrical resistance and an amorphous carbon film which covers the metal sheet and constitutes the surface of the gas flow path. The hydrogen content CH of the amorphous carbon film is 1 to 20 atomic percent. That document proposes a method of vapor deposition of a carbonaceous film using thin film-forming techniques (P-CVD, ion beam vapor deposition, or the like) instead of the above-described electrically conductive painted film.

(D) Patent Document 5 discloses a stainless steel sheet having a large number of minute pits formed over its entire surface, and a large number of fine projections are formed in the periphery of the pits. This stainless steel sheet is formed by immersing the stainless sheet in a ferric chloride solution and then carrying out alternating electrolytic etching.

Similar to Patent Document 5, Patent Document 7 discloses a separator plate having a surface coated with an oxidation resistant film. The surface is roughened to form irregularities. Portions where the coating is removed from the peaks of bumps become electrically conductive portions.

(E) Patent Document 6 discloses a means of heat treating a stainless steel member having carbonaceous particles adhered to its surface. A diffusion electrode layer is formed between the carbonaceous particles and the stainless steel. As a result, adhesion is increased, and electrical conduction between the carbon particles and the stainless steel can be achieved with certainty.

PRIOR ART DOCUMENTS

Patent Documents

Patent Document 1: JP 10-228914 A
Patent Document 2: JP 11-345618 A
Patent Document 3: WO 2003/044888
Patent Document 4: JP 2000-67881 A
Patent Document 5: WO 2002/23654
Patent Document 6: WO 1999/19927
Patent Document 7: WO 2000/01025
Patent Document 8: WO 2001/18895
Patent Document 9: JP 3365385 B
Patent Document 10: JP 11-121018 A

DISCLOSURE OF INVENTION

Problem which the Invention is to Solve

Above-described methods (A) to (E) have been proposed in order to solve the above-described problems related to a separator formed from a metal such as stainless steel by a means other than gold plating. However, at the present time, none of these techniques has been put to actual use, and each technique is thought to have technological problems which need to be solved. The problems of each of these techniques which were confirmed by follow-up tests by the present inventors are listed below.

Above-described method (A) is a method in which a surface oxide film on a stainless steel member is removed by pickling, and the surface of the stainless steel member after pickling is coated with an electrically conductive paint containing carbon. The member which is coated with an electrically conductive paint after pickling has an increased contact resistance compared to the member in an as-pickled state (in which the electrically conductive material has not applied). The contact resistance of a material coated with an electrically conductive paint is at least ten times as high as with gold plating. Therefore, this method cannot be used as a replacement for gold plating.

Above-described method (B) has the problems that the electrically conductive coating does not sufficiently adhere to the substrate, so peeling of the coating takes place at the time of assembly of a fuel cell, and peeling of the coating occurs due to swelling and contraction of a MEA (membrane-electrode assembly) accompanying operation and stopping of a cell.

Above-described method (C) is a film forming technique in which processing costs are high and much time is required for processing. Therefore, that method is not suitable for mass production.

In above-described method (D), a passive film is formed on the entire surface of minute projections, so it is not possible to decrease the contact resistance with respect to a gas diffusion electrode layer (a carbon electrode).

In above-described method (E), a carbon diffusion electrode layer passes through a passive film, so it is possible to decrease the contact resistance with the gas diffusion electrode layer. However, during operation of a fuel cell, a local cell is formed in the interface between the carbon diffusion electrode layer and the base metal. This results in the problem that corrosion is promoted and contact resistance increases. Accordingly, that method is not suitable for practical application.

A separator made of stainless steel (referred to below as a stainless separator) is extremely practical from the standpoints of material costs and processing costs. The high degree of corrosion resistance of a stainless separator is largely due to the presence of a passive film on its surface. However, since the presence of a passive film increases its contact resistance, it has the problem that resistance losses are large when collecting generated electricity with a stainless separator.

Methods in which the surface of a separator is plated with gold or coated with carbon have been proposed in order to solve such problems, but these methods have not led to wider use of stainless separators.

In the method disclosed in Patent Document 9, electrically conductive boride precipitates and/or carbide precipitates are exposed on the surface of a stainless steel member so as to pass through a passive film formed on the surface of the stainless separator. These precipitates thus contact a gas diffusion electrode layer to thereby guarantee electrical conductivity between the stainless separator and the gas diffusion electrode layer. This method has the effect of greatly reducing contact resistance, but in the operating environment of a solid polymer fuel cell, oxides which are formed on the surface of precipitates gradually grow as operation progresses. Therefore, over long periods of operation, the contact resistance becomes high and the problem occurs that the output voltage of the cell gradually decreases. Accordingly, this method has need for improvement. This problem can be solved if the increase in contact resistance can be suppressed by a method having excellent economy.

The object of the present invention is to provide with high productivity, i.e., inexpensively, a stainless steel member for a separator for a solid polymer fuel cell which can solve the above-described problem of an increase in contact resistance without worsening the corrosion resistance of a stainless separator, which has little deterioration in properties over long periods of operation, and which has excellent cell properties, as well as to provide a solid polymer fuel cell using the stainless steel member.

Means for Solving the Problem

The present inventors performed various investigations with the aim of solving the above-described problems.

When the inventors conducted tests of the prior art, they found that gold plating provides a low initial contact resistance and little increase in contact resistance after operation of a fuel cell.

However, gold is expensive with a mine cost of 3068 yen per gram (morning edition of the Nihon Keizai Shinbun of Jun. 17, 2008), and in recent years there has been a tendency for its price to suddenly increase. Moreover, gold is a scarce resource, so using large amounts for industrial applications is not practical.

Various methods of coating the surface of a metal separator with carbon have been proposed as methods of using a metal separator (a stainless separator) which is not subjected to gold plating.

When the present inventors tested carbon coating methods which have been proposed up to now, they confirmed that the methods have some effect, but the degree of improvement is inadequate, and the methods have problems such as that (1) the contact resistance is low compared to gold plating, and (2) depending upon the coating method, peeling takes place in the cell operating environment and the effect of the methods does not continue.

While the resistivity of gold is $2.35 \times 10^{-6}$ Ω-cm, the resistivity of carbon is an average of $1375 \times 10^{-6}$ Ω-cm ("Machines and Metals for Young Engineers", Maruzen Corporation, page 325). Therefore, it is clearly difficult to realize a contact resistance of the same order as gold plating if a metal separator (a stainless separator) is simply coated with carbon.

Taking into consideration the difference in physical properties of materials, the present inventors performed investigations with the aim of achieving a means which can realize a low contact resistance close to that of gold plating by carbon coating and which does not have problems such as peeling in the operating environment of a cell.

As a result, they obtained the following knowledge. By combining this knowledge, it is possible to solve problems which could not be achieved by the prior art.

(A) It is possible to remove a passive film on the surface of a stainless steel base metal of a stainless steel member using a nonoxidizing acid or the like.

A nonoxidizing acid is an acid such as hydrochloric acid, sulfuric acid, and hydrofluoric acid which is not an acid such as nitric acid having oxidizing power.

Even if this removal treatment is carried out, during pickling or immediately after pickling, a passive film is again formed on a stainless steel base metal. A separator obtained from this stainless steel member has a thin passive film compared to a separator made from a stainless steel member which has not undergone removal treatment, so the initial contact resistance is decreased. However, if it is exposed to a harsh environment during the operation of a fuel cell, a passive film grows on the surface of the stainless steel base metal forming the separator. Therefore, a separator obtained from a stainless steel member which has undergone removal treatment has the problem that its contact resistance increases during use.

(B) A separator obtained from a stainless steel member which has undergone carbon coating on its surface can decrease in the initial contact resistance and suppress an increase in the contact resistance in the environment of operation of a fuel cell. However, it has problems like those described above.

(C) The present inventors prepared a fuel cell separator from a stainless steel member having an electrically conductive substance derived from the stainless base metal precipitated on the surface of the stainless steel base metal. The present inventors found that in the same manner as with gold plating, the initial contact resistance of the separator decreased and an increase in the contact resistance caused by the growth of a passive film in the environment of operation of a fuel cell was suppressed.

(D) Typically, the above-described electrically conductive substance can be obtained by immersing a stainless steel member in an acid solution containing sulfate ions (referred to below as a sulfuric acid solution) and preferably dilute sulfuric acid or by anode electrolysis of the stainless steel member in a sulfuric acid solution. The electrically conductive substance which is obtained in this manner is an amorphous substance having O, S, Fe, Cr, and C as components, or it is an electrically conductive polycrystalline substance comprising microcrystals.

The present invention was completed based on the above findings and is as follows.

According to one aspect, the present invention provides a stainless steel member for a separator for a solid polymer fuel cell comprising a stainless steel base metal, and a passive film and electrically conductive precipitates both of which are provided on a surface of the stainless steel base metal, wherein the electrically conductive precipitates pass through the passive film and comprise electrically conductive smut including a substance originating from the stainless steel base metal.

The stainless steel base metal refers to the portion of the stainless steel member for a separator not including a passive film.

A passive film is a film of an electrically insulating oxide formed on the surface of the base metal by a reaction of the stainless steel base metal with oxygen in the atmosphere or the like.

The electrically conductive precipitates pass through the passive film, so the surface of the stainless steel member is constituted by the surface of the passive film and the surface of the electrically conductive precipitates.

The electrically conductive precipitates may be polycrystalline substances having O, S, Fe, Cr, and C as constituent elements.

An electrically conductive layer comprising a nonmetallic electrically conductive substance may be provided on the surface of the above-described oxide. This electrically conductive layer may be electrically connected to the stainless steel base metal through the electrically conductive precipitates.

Here, a nonmetallic electrically conductive substance is an electrically conductive substance in which the material which primarily provides electrical conductivity does not have metal bonds, with a typical such material being graphite-based carbon. During the operation of a fuel cell having a separator of a material having a nonmetallic electrically conductive substance on its surface, even if corrosion develops in the nonmetallic electrically conductive substance, there is almost no outflow of metal ions. Therefore, an increase in the contact resistance between the separator and a gas diffusion electrode layer does not readily develop due to corrosion products, and it is difficult for metal ions to diffuse in the solid polymer electrolyte film which causes a degradation of the electrolyte film.

The nonmetallic electrically conductive substance may contain graphite-based carbon.

When the nonmetallic electrically conductive substance contains graphite-based carbon, the interplane spacing d002 between the graphite-based carbon provided on the surface of the oxide is preferably at most 3.390 Angstroms.

When the peak strengths of the diffraction lines of the atomic planes obtained by wide angle x-ray diffraction measurement are compared for the crystals of graphite-based carbon provided on the surface of the passive film on the surface of a stainless steel base metal, the ratio of the peak strength of the diffraction line of the (110) atomic plane to the peak strength of the diffraction line of the (004) atomic plane is preferably less than 0.1.

The above-described electrically conductive layer may be formed by rubbing a member containing graphite-based carbon with respect to a surface comprising the surface of the passive film and the surface of the electrically conductive precipitates.

The average surface roughness Ra of a surface comprising the surface of the passive film and the surface of the electrically conductive precipitates is preferably at least 0.10 micrometers.

The electrically conductive precipitates and the electrically conductive layer may be formed by rubbing a stainless steel substrate comprising the stainless steel base metal and the passive film with respect to a member including graphite-based carbon which functions as a counter electrode in electrolysis treatment while carrying out electrolysis treatment in an acid solution including sulfate ions.

The average surface roughness Ra of the surface of the stainless steel substrate is preferably at least 0.10 micrometers.

In another aspect, the present invention provides a solid polymer fuel cell having a separator obtained from the above-described stainless steel member.

Effects of the Invention

By using a separator made from a stainless steel member according to the present invention, it is possible to provide a solid polymer fuel cell which does not need expensive surface treatment such as gold plating, which has excellent electrical generating performance, which has little deterioration in cell performance, and which has excellent economy.

EMBODIMENTS OF THE INVENTION

1. Electrically Conductive Precipitates

Figure 1:
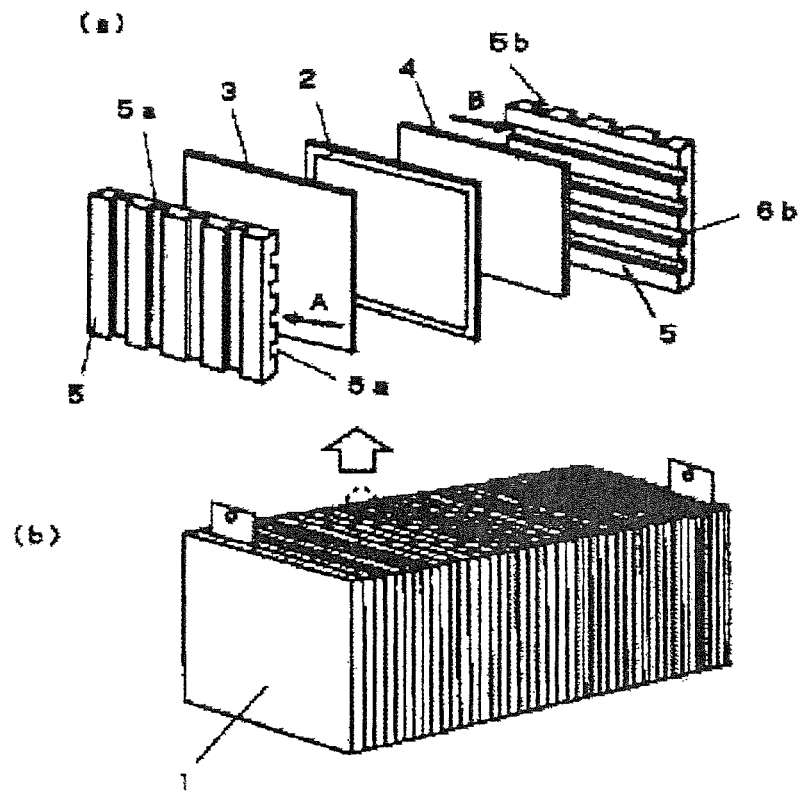
FIG. 1 is a drawing schematically showing the structure of a solid polymer fuel cell.

A stainless steel member according to the present invention comprises a stainless steel base metal, and a passive film and electrically conductive precipitates both of which are provided on a surface of the stainless steel base metal. The electrically conductive precipitates pass through the passive film and include substances originating from the stainless steel base metal. In such a structure, the surface of the stainless steel member comprises the surface of the electrically insulating passive film and the surface of the electrically conductive precipitates which are discretely present. The electrically conductive precipitates form an electrical connection to the stainless steel base metal.

In the present invention, the stainless steel base metal refers to a portion of the stainless steel member comprising stainless steel (a metal), and it does not include the passive film formed on the surface of the stainless steel member.

There are no particular limitations on the composition of the stainless steel base metal as long as a passive film can be formed on its surface, and it can be austenitic or ferritic as long as it is within the composition range given by JIS G 4305.

A typical steel composition is as follows.

An example of austenitic stainless steel is a steel containing, in mass percent, C: at most 0.2%, Si: at most 2%, Mn: at most 10%, Al: at least 0.001% to at most 6%, P: at most 0.06%, S: at most 0.03%, N: at most 0.4%, Cr: at least 15% to at most 30%, Ni: at least 6% to at most 50%, B: at least 0% to at most 3.5%, and a remainder of Fe and impurities. From the standpoints of strength, workability, and corrosion resistance, in place of a portion of the Fe, the above-described austenitic stainless steel may contain, in mass percent, Cu: at most 2%, W: at most 5%, Mo: at most 7%, V: at most 0.5%, Ti: at most 0.5%, and Nb: at most 0.5%.

An example of a ferritic stainless steel is a stainless steel containing, in mass percent, C: at most 0.2%, Si: at most 2%, Mn: at most 3%, Al: at least 0.001% to at most 6%, P: at most 0.06%, S: at most 0.03%, N: at most 0.25%, Cr: at least 15% to at most 36%, Ni: at most 7%, B: at least 0% to at most 3.5%, and a remainder of Fe and impurities. From the standpoints of strength, workability, and corrosion resistance, in place of a portion of Fe, above-described ferritic stainless steel may contain, in mass percent, Cu: at most 2%, W: at most 5%, Mo: at most 7%, V: at most 0.5%, Ti: at most 0.5%, and Nb: at most 0.5%.

An example of a dual-phase stainless steel is a stainless steel containing, in mass percent, C: at most 0.2%, Si: at most 2%, Mn: at most 10%, Al: at least 0.001% to at most 6%, P: at most 0.06%, S: at most 0.03%, N: at most 0.4%, Cr: at least 20% to at most 30%, Ni: at least 1% to at most 10%, B: at least 0% to at most 3.5%, and a remainder of Fe and impurities. From the standpoints of strength, workability, and corrosion resistance, in place of a portion of the Fe, above-described dual-phase stainless steel may contain, in mass percent, Cu: at most 2%, W: at most 5%, Mo: at most 7%, V: at most 0.5%, Ti: at most 0.5%, and Nb: at most 0.5%.

The reasons for the limits on each of the components are as follows. Percent with respect to the content of elements means mass percent.

C is an element which is necessary for guaranteeing the strength of steel, but if it is contained in excess, workability deteriorates, so its upper limit is made 0.2%. Preferably it is at most 0.15%.

Si is a component which is added as a deoxidizing agent. However, if it is added in excess, it leads to a decrease in ductility, and particularly in a dual-phase stainless steel, it promotes precipitation of sigma ($\sigma$) phase. Accordingly, the content of Si is made at most 2%.

Mn is added because it has a deoxidizing action and an action of fixing S in steel as Mn-based sulfides. At the same time, it is an austenite stabilizer, so it contributes to stabilization of the phase in an austenite stainless steel. In a dual-phase stainless steel, it is added for the purpose of adjusting the ratio of the ferrite phase. However, if it is added in excess, it has the problem that it lowers corrosion resistance, but when it is contained as a replacement for Ni, it may be contained in an amount of up to 10%, and in a ferritic stainless steel, there is no need to replace Ni, so its upper limit is made 3%.

P and S are elements which are present as impurities, and they decrease corrosion resistance and hot workability, so their contents are at most 0.06% and at most 0.03%, respectively.

Al is added as a deoxidizing element at the time of steel melting. When the steel of the present invention contains B, a $M_2B$ type boride may be formed in the steel. However, B is an element having strong bonding strength for oxygen in molten steel, so it is preferable to decrease the oxygen concentration by Al deoxidation. For this purpose, Al is preferably contained in a range of 0.001 to 6%.

N is an impurity in a ferritic stainless steel. N deteriorates room temperature toughness, so its upper limit is preferably made 0.25%. A lower content is preferable and it is preferably at most 0.1%. In an austenitic or dual-phase stainless steel, N is an element being capable of forming an austenite phase, so it is effective for adjusting the balance of the austenite phase and for increasing corrosion resistance. However, an excessive content degrades workability, so its upper limit is preferably made 0.4%.

Cr is an element which is necessary for guaranteeing the corrosion resistance of stainless steel. In austenitic or ferritic stainless steel, a content of at least 15% is necessary, and in a dual-phase stainless steel, a content of 20% is necessary. If the Cr content exceeds 36% in a ferritic stainless steel, it becomes difficult to carry out mass production. In an austenitic stainless steel, if it exceeds 30%, the austenite phase becomes unstable even if adjustment of other alloying components is carried out. In a dual-phase stainless steel, if Cr exceeds 30%, the ferrite phase increases and it becomes difficult to maintain a dual-phase structure.

Ni is an austenite stabilizer, and it can increase corrosion resistance in an austenitic stainless steel. If its content is less than 6%, the austenite phase becomes unstable, while if it exceeds 50%, manufacture becomes difficult. Even in a ferritic stainless steel, it has the effect of improving corrosion resistance and toughness, but if it exceeds 7%, the ferrite phase becomes unstable, so the upper limit is made 7%. In a dual-phase stainless steel, it also has the effect of improving corrosion resistance and toughness, so it is contained in an amount of at least 1%. However, if it is contained in excess of 10%, it leads to an excessive increase in the austenite phase and a decrease in the ferrite phase.

B is an element which is optionally added, since it has the effect of increasing hot workability. In order to obtain this effect, it is made to be contained at an amount of at least 0.0001%. In addition, B exhibits a supplemental action of decreasing the contact resistance of the surface of the stainless steel base metal, since B precipitates in a stainless steel base metal as $M_2B$-type borides and specifically as $M_2B$-type which mainly contain Cr and Fe and further contain minute amounts of Ni or Mo such as $(Cr, Fe)_2B$ and $(Cr, Fe, Ni)_2B$, and electrically conductive precipitates precipitate during pickling with sulfuric acid or the like on the surfaces of the borides which are exposed on the surface of the stainless steel base metal during pickling. In order to exhibit this effect, it is made to be contained at an amount of at least 0.1%. However, if B is contained in excess of 3.5%, it is difficult to carry out manufacture by a usual melting method.

Cu, W, Mo, V, Ti, and Nb are elements which are optionally added. They are elements which improve strength, corrosion resistance, and the like, and their upper limits are respectively 2%, 5%, 7%, 0.5%, 0.5%, and 0.5%. When the content exceeds these amounts, the above-described effects do not increase in accordance with an increase in the content of these elements, and workability is sometimes worsened.

Rare earth elements (La, Ce, Nd, Pr, Y, and the like) are elements which are optionally added. They are elements which improve corrosion resistance, and the total content of rare earth elements has an upper limit of 0.1%. If they are contained in excess of 0.1%, the above-described effects do not increase in accordance with an increase in the content of these elements, and there is sometimes a worsening of the castability of stainless steel (specifically, the occurrence of clogging of nozzles at the time of continuous casting and the like).

"The electrically conductive precipitates contain substance originating from the stainless steel base metal" mean that the electrically conductive precipitates include one or more elements in the stainless steel base metal such as Fe, Cr, Ni, C, Si, Mn, Cu, Mo, and W, since the electrically conductive precipitates include a portion of the stainless steel base metal which has dissolved or fallen off. However, the composition of electrically conductive precipitates is usually not the same as the composition of stainless steel, and the chemical and physical properties of electrically conductive precipitates differ from the properties of the stainless steel base metal.

The precipitates in electrically conductive precipitates mean substances which are present on the surface of the stainless steel base metal by precipitation on the surface of the stainless steel base metal and substances which are present on the surface of the stainless steel base metal due to substances which precipitate elsewhere than on the surface of the stainless steel base metal and then adhere to the surface of the stainless steel base metal.

Specific examples of electrically conductive precipitates are electrically conductive carbides which are formed by bonding carbon contained in steel and Fe or Cr which primarily form metallic bonds in stainless steel, substances formed solely of carbon, and precipitates produced when metal ions such as Cu, Mo, W, and Ni which are dissolved from stainless steel again precipitate as metals.

Among such electrically conductive precipitates, electrically conductive precipitates will be explained below in detail taking as an example electrically conductive smut which is obtained by contacting a stainless steel member with an acidic solution containing nonoxidizing acid ions (referred to below as a nonoxidizing acid solution).

Here, a nonoxidizing acid solution is an acidic solution containing ions of an acid other than an acid such as nitric acid having an oxidizing power (an oxidizing acid) and which can remove a passive film on a stainless steel member and expose the stainless steel base metal. Examples of a nonoxidizing acid are a halogenated hydroacid acid such as hydrofluoric acid and hydrochloric acid, and sulfuric acid. One or more types of nonoxidizing acid may be contained in the nonoxidizing acid solution, and it may contain components which are effective at removing a passive film other than a nonoxidizing acid. As stated below, it may also contain ions of an oxidizing acid.

As stated above, by immersing a stainless steel member in a nonoxidizing acid solution, the passive film on its surface can be reduced in thickness. A separator formed from the stainless steel member after this immersion has a low initial contact resistance, but it has the problem that the passive film regrows not only under a severe environment of use of an actual fuel cell but also during storage for long periods in the air and its contact resistance gradually increases.

As a result of investigations by the present inventors of decreasing contact resistance, it was found that among smut which develops at the time of contact between a nonoxidizing acid solution and a stainless steel member, there is some smut having electrical conductivity.

Smut here refers to a substance which is formed by contact between a nonoxidizing acid solution and a stainless steel member. Specifically, smut refers to a substance formed by the following processes. A substance constituting a metal or stainless steel having a passive film is dissolved or removed from the metal or stainless steel by a nonoxidizing acid (collectively referred to below as dissolving). Based on this substance, a substance having a composition different from stainless steel (metal) or a passive film is formed. This substance precipitates on and/or adheres to the surface of the stainless steel member (these processes being collectively referred to below as precipitation).

If the type of nonoxidizing acid contained in the solution which is contacted is not appropriate, the smut discolors the surface of the stainless steel and sometimes mars the appearance of the surface. Therefore, treatment for removing the smut or suitably selecting the type of acid so that at least discoloration did not take place was usually carried out.

The present inventors discovered that of this smut which is normally avoided, if smut having electrical conductivity (referred to below as electrically conductive smut) can be made to precipitate on the surface of a stainless steel base metal, there is the possibility of using it to decrease contact resistance or to suppress an increase in the contact resistance at the time of operation of a fuel cell. When the present inventors carried out further investigations based on this discovery, they found that electrically conductive smut is excellent with respect to (1) electrical conductivity with respect to a stainless steel base metal, (2) adhesion to the stainless steel base metal, and (3) resistance to chemicals.

The reasons why electrically conductive smut has these excellent properties are as follows.

Namely, when a stainless steel member is immersed in a nonoxidizing acid solution, the passive film formed on the surface of the stainless steel base metal is dissolved by the nonoxidizing acid, and a portion of the stainless steel base metal which is exposed is also dissolved by the acid. Since substances including substances which originate from the dissolved stainless steel and which precipitate on the surface of the stainless steel base metal are smut, this precipitated smut is present on the surface of the stainless steel base metal. Accordingly, when the smut is electrically conductive, the peaks of the electrically conductive smut which precipitates on the surface of the stainless steel base metal are electrically connected to the stainless steel base metal.

A state in which the stainless steel base metal is exposed can stably exist only when the stainless steel base metal is immersed in the nonoxidizing acid solution. Once the base metal is removed from the solution and left in the atmosphere or it is immersed in a nonacidic solution by washing with water or the like, a passive film is rapidly formed on the exposed portions of the stainless steel base metal. As stated above, this passive film has poor electrical conductivity but it has excellent corrosion resistance. Due to the formation of a passive film, the electrically conductive smut is present on the stainless steel member so as to penetrate the passive film and contact the stainless steel base metal. Accordingly, the resulting stainless steel member has the properties of a low contact resistance provided by the electrically conductive smut while having corrosion resistance provided by the passive film.

The smut has components constituting the stainless steel which was once dissolved, and it is a substance which precipitated on the surface of the stainless steel base metal in a corrosive nonoxidizing acid solution. Therefore, the difference in electrical potential between the electrically conductive smut and the stainless steel base metal is small. This makes it difficult for a local cell to form between the electrically conductive smut and the stainless steel base metal. Accordingly, it is difficult for the electrically conductive smut to corrode or for the stainless steel base metal surrounding the electrically conductive smut to corrode and for the electrically conductive smut to fall off. In contrast, when an electrically conductive substance is supplied from the exterior so as to penetrate the passive film and reach the stainless steel base metal so that an electrically conductive substance is present on the surface of the stainless steel member, corrosion due to a local cell between the electrically conductive substance and the stainless steel base metal is nearly unavoidable. In this case, the electrically conductive substance often corrodes in a short period of time, and the adhesion of the electrically conductive substance to the stainless steel base metal often decreases.

The passive film which is formed so as to cover the surface of a stainless steel base metal which was once exposed grows so as to partially cover the electrically conductive smut on the surface of the stainless steel base metal. Therefore, the electrically conductive smut which contacts the stainless steel base metal is surrounded by the passive film. Accordingly, the electrically conductive smut is prevented from falling off the stainless steel base metal by the passive film.

There are no particular limitations on the composition of an electrically conductive smut according to the present invention as long as it has electrical conductivity. Its composition greatly varies in accordance with the composition of the stainless steel base metal, the type of nonoxidizing acid contained in the nonoxidizing acid solution, the type of substances other than ions of the nonoxidizing acid in the nonoxidizing acid solution, and the conditions under which the stainless steel member contacts the nonoxidizing acid solution (the concentration, temperature, time, electrolysis conditions, and the like).

Concerning the size, it is necessary for the thickness of the smut to be larger than the thickness of the passive film, but the thickness of the passive film also varies in accordance with the composition of the stainless steel base metal and the like. Therefore, the lower limit can be suitably set in accordance with the thickness of the passive film. As for an upper limit, when the smut thickness is too much greater than the thickness of the passive film, there is a concern of the smut dropping off the stainless steel base metal during secondary working of the separator or during use of the separator. Therefore, from the standpoint of preventing the smut from dropping off, the upper limit can be set based on the relationship to the thickness of the passive film.

There is no particular limitation on the crystal structure of the smut as long as electrical conductivity can be achieved.

An example of electrically conductive smut according to the present invention having the above-described properties will next be described in detail together with an example of a manufacturing method.

A typical example of a method of forming electrically conductive smut according to the present invention is one in which a stainless steel member is contacted by a sulfuric acid solution, namely, an acid solution containing sulfate ions, and specifically by immersion treatment (referred to below as sulfuric acid treatment). If a stainless steel substrate comprising a stainless steel base metal and a passive film formed on its surface is immersed in dilute sulfuric acid, the passive film formed on its surface is removed, and electrically conductive smut is formed. By suitably varying the treatment conditions, the electrically conductive smut can be precipitated so as to be scattered over the surface of the stainless steel base metal or it can be precipitated so as to substantially cover the surface of the stainless steel base metal.

Electrically conductive smut which is obtained in this manner varies in size, composition, precipitated state, and the like. By removing the stainless steel member from the sulfuric acid and washing it with water and preferably carrying out brushing or ultrasonic cleaning, smut which is not retained by the stainless steel member and specifically powdery smut which is excessively formed and the like can be removed. In this manner, only electrically conductive smut in the form of electrically conductive precipitates having excellent adhesion can be made to be present on the surface of the stainless steel member.

Prior to the above-described washing with water, after immersion in sulfuric acid and formation of electrically conductive smut, it is possible to subject the stainless steel member having electrically conductive smut to anode electrolysis. As a result of this anode electrolysis, electrically conductive smut having inferior corrosion resistance is dissolved away, so only electrically conductive smut having excellent corrosion resistance can be precipitated on the surface of a stainless steel base metal as electrically conductive precipitates.

Alternatively, instead of sulfuric acid treatment, it is possible to carry out electrolysis treatment in a sulfuric acid solution (referred to below as sulfuric acid electrolysis treatment). This sulfuric acid electrolysis treatment can be carried out using direct current or alternating current. It is also possible to employ direct conduction using the stainless steel base metal as an electrode, or it is possible to employ indirect conduction in which the stainless steel substrate does not directly contact the terminal of the power supply. When sulfuric acid electrolysis treatment is carried out in this manner, smut having inferior corrosion resistance is dissolved from the surface of the stainless steel base metal during electrolysis, so only smut having excellent corrosion resistance is formed on the surface of the stainless steel base metal.

In the case of sulfuric acid electrolysis treatment as well, in the same manner as in sulfuric acid treatment, by performing washing with water and preferably by brushing or ultrasonic cleaning, it is possible to achieve electrically conductive smut having excellent corrosion resistance and adhesion on the surface of the stainless steel base metal.

Figure 2:
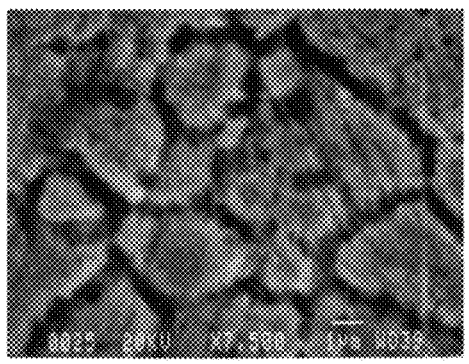
FIG. 2 is a SEM image (1), a STEM image (2), and an electron beam diffraction image (3) of electrically conductive smut formed on the surface of SUS 316.
Figure 2:
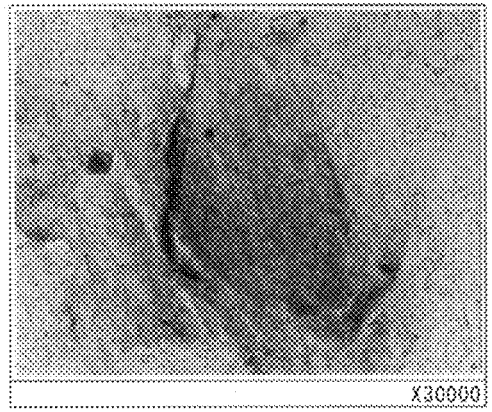
Figure 2:
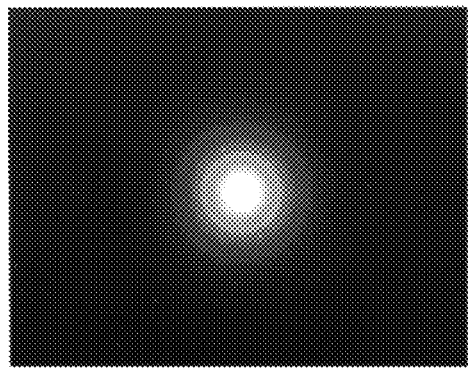

The electrically conductive smut which was formed by this sulfuric acid electrolysis treatment was subjected to component analysis and surface analysis by STEM-EDX and ESCA on a sample extracted by the blank replica method. As a result, as shown in FIGS. 2(1) and 2(2), the electrically conductive smut was in the form of irregularly shaped precipitates with a size of at most 1 micrometer.

Table 1 shows the result of quantitative analysis of the outermost layer based on a narrow scan spectrum of electrically conductive smut. As shown in Table 1, the electrically conductive smut contains O, S, Fe, Cr, and C as main constituent elements.

TABLE 1

| Element | C | N | O | Na | Si | S | Cl | K | Cr | Fe | Ni | Mo |
|---|---|---|---|---|---|---|---|---|---|---|---|---|
| Atomic % | 38.4 | * | 40.9 | 2.1 | 1.6 | 1.0 | 0.4 | 0.2 | 7.9 | 6.1 | 1.5 | * |

The apparatus and measurement conditions used in this analysis were as follows.

Apparatus: Quantera SXM manufactured by Ulvac-Phi, Inc.

X-ray source: mono-AlKα (hv=1486.6 eV)

Testing depth: Several nm (photoelectron output angle: 45 degrees)

X-ray beam radius: diameter of 100 micrometers (point analysis)

Neutralizing Gun: 1.0 V, 20 µA

The asterisks below N and Mo in Table 1 mean that the peaks for these elements overlapped the peaks for other elements, so quantitative analysis could not be carried out.

The chemical composition of the stainless steel base metal on the surface of which the analyzed electrically conductive smut was precipitated was as follows. C, 0.02 mass %, Si: 0.21 mass %, Mn: 1.8 mass %, P: 0.018 mass %, S: 0.002 mass %, N, 0.015 mass %, Cr: 17.5 mass %, Ni: 12.2 mass %, Mo: 2.20 mass %, and a remainder of Fe and impurities.

Of the main constituent elements of the electrically conductive smut, Fe, Cr, and C are derived from the stainless steel base metal, and O and S are primarily derived from sulfuric acid. As shown in FIG. 2(3), electron beam diffraction of a sample obtained by the blank replica method shows that the crystal state of the electrically conductive smut is microcrystals and the electrically conductive smut is a polycrystalline body comprising microcrystals.

The above explanation used electrically conductive smut as an example, but a method of forming electrically conductive precipitates according to the present invention on the surface of a stainless steel base metal is not limited to the above method. Any method can be used that removes a passive film by a nonoxidizing acid or the like and precipitates electrically conductive precipitates including substances originating from (derived from) the exposed stainless steel base metal can be used.

The technical idea which is the basis for the present invention is that by precipitating an electrically conductive substance including a substance originating from the stainless steel base metal so as to electrically contact the stainless steel base metal, electrical conductivity between the electrically conductive substance and the stainless steel base metal is guaranteed, corrosion due to a local cell between the electrically conductive substance and the stainless steel base metal is suppressed, and a change over time in the electrical conductivity is suppressed. Accordingly, the precipitated elements are not limited to O, S, Fe, Cr, and C. For example, by contacting a stainless steel base metal containing an element having a lower ionization tendency than hydrogen, a specific example of which is copper, with an acid, the element such as copper can be precipitated on the surface of the stainless steel base metal, Or, by electrolysis including cathode electrolysis of a stainless steel base metal, an element having a larger ionization tendency than hydrogen such as Mo, W, and the like can be precipitated on the surface of the stainless steel base metal.

Furthermore, when precipitating electrically conductive smut by contacting a stainless steel substrate with a nonoxidizing acid solution, the nonoxidizing acid solution may sometimes contain an oxidizing acid such as nitric acid.

According to a general idea, if a stainless steel substrate is contacted with an acid solution primarily containing ions of an oxidizing acid such as nitric acid (referred to below as an oxidizing acid solution), the surface of the stainless steel substrate is oxidized by the oxidizing acid ions, and a passive film is formed on the surface of the stainless steel base metal in the acid solution. Therefore, even if the elements which are the basis for the electrically conductive substance are once dissolved or released by contact with the oxidizing acid solution, they precipitate not on the surface of the stainless steel base metal but on the passive film. Accordingly, when using an oxidizing acid solution, it becomes difficult to decrease the contact resistance of the stainless steel member. Furthermore, when using an oxidizing acid solution, there is a tendency for smut to adhere to the surface of a stainless steel base metal, and this makes it difficult to decrease the contact resistance.

However, even when the solution which contacts the stainless steel substrate contains an oxidizing acid, when the solution also contains components which suppress the formation of a passive film or remove a passive film and the effects of these components are predominant, a passive film is not formed on the surface of the stainless steel base metal, and good electrically conductive smut is sometimes formed on the surface of the stainless steel base metal. For example, with a mixed acid having a high dissolving speed such as 5% hydrofluoric acid+10% hydrochloric acid+10% nitric acid, it is difficult for a passive film to form during pickling and electrically conductive substances directly precipitate on the surface of the stainless steel base metal.

In this manner, even with an oxidizing acid, which is generally considered unsuitable as a component of a solution for precipitating an electrically conductive smut on the surface of a stainless steel base metal because it forms a passive film, depending upon the overall composition of the solution, an oxidizing acid may sometimes be contained as a component of a solution for precipitating electrically conductive smut on the surface of a stainless steel base metal.

2. Electrically Conductive Layer

With the object of protecting and further decreasing the contact resistance of the above-described electrically conductive precipitates according to the present invention which are precipitated on and preferably cover the surface of the stainless steel base metal, it is possible to form an electrically conductive coating layer (referred to below as an electrically conductive layer) including a nonmetallic electrically conductive substance on the stainless steel member.

Nonmetallic electrically conductive substances include carbon black or electrically conductive paints, ITO (indium tin oxide), and chemical compound type electrically conductive substances such as WC. However, a graphite-based carbon can achieve the above-described objects to a high degree so is preferred. A coating layer including graphite-based carbon (referred to below as a graphite layer) will be explained in detail below as an electrically conductive layer.

As the graphite-based carbon contained in the graphite layer, it is possible to use any of flake graphite, scaly graphite, expanded graphite, natural graphite, synthetic graphite, and the like. As stated below, from the standpoint of maximizing the anisotropic electrical conductivity of graphite-based carbon, it is preferable to use types having a shape with a large aspect ratio (diameter/height) such as flake graphite or scaly graphite.

The graphite-based carbon which forms a coating needs to have (1) high electrical conductivity and (2) sufficient corrosion resistance even in an atmosphere where sulfuric acid or fluorine ions or the like are present. Furthermore, (3) the graphite-based carbon is preferably a soft material so that it can easily perform coating by rubbing from the standpoint of a preferred manufacturing method stated below (a stainless steel member and a member containing graphite-based carbon are rubbed together, the graphite-based carbon is scraped off with files formed of the projections of the surface irregularities of the stainless steel member and the electrically conductive precipitates, and the scraped graphite-based carbon is made adhere to the surface of the passive film on the surface of the stainless steel base metal so that an a axis direction of the adhering graphite-based carbon is preferentially parallel to the surface of the passive film).

It is preferable to use graphite-based carbon having high crystallinity, and it is particularly preferable for the spacing between the C planes of the graphite-based carbon to be d002≤3.390 Angstroms, from the standpoint of simultaneously satisfying these demands, as described below.

(1) Electrical Conductivity

Anisotropy exists in the electrical resistance of graphite-based carbon of high crystallinity ("Properties and Technological Development of Graphite", Hitachi Powder Metallurgy Technical Report No. 3 (2004), Table 1). The volume resistivity in the a axis direction is a low value of 4 to $7 \times 10^{-5}$ Ω-cm while the value in the c axis direction is a high value of 1 to $5 \times 10^{-1}$ Ω-cm. The electrical conductivity in the a axis direction is brought about by the resonance of π bonds in the sp2 bonds, so the higher the crystallinity, the lower the volume resistivity. Therefore, by using graphite-based carbon having a high crystallinity of d002≤3.390 Angstroms, the volume resistivity in the a axis direction becomes particularly low, the overall volume resistivity of the graphite-based carbon becomes low, and this brings about a decrease in contact resistance. Considering that the average resistance of typical carbon is $1375 \times 10^{-6}$ Ω-cm ("Machines and Metals for Young Engineers", Maruzen Corporation, page 325), it is preferable to actively utilize the low volume resistivity (4 to $7 \times 10^{-5}$ Ω-cm) in the a axis direction of graphite-based carbon.

As described below, if a material containing graphite-based carbon of high crystallinity is rubbed against a surface comprising a passive film and electrically conductive precipitates, which is a surface of a stainless steel member having electrically conductive precipitates (referred to below as a surface to be treated), the graphite-based carbon is torn to pieces and becomes a scale-shaped powder, it adheres to the surface to be treated, and a stainless steel member having a graphite layer provided on the surface of the passive film and preferably on the surface to be treated is then obtained. At this time, the graphite-based carbon adhering to the surface to be treated comprises scale-shaped powder having a high aspect ratio, so much of the powder is aligned so that the a axis direction is parallel to the treated surface so as to minimize the effect of shear force due to rubbing.

In this case, it becomes particularly easy for electric charge to move in the graphite layer in the direction parallel to the surface of the passive film. Therefore, if a separator manufactured from a stainless steel member having this graphite layer contacts a gas diffusion electrode layer, even when there are no electrically conductive precipitates which directly conduct with the stainless steel base metal at the contact portions and the gas diffusion electrode layer solely contact the graphite-based carbon of the graphite layer, electric charge rapidly moves to the vicinity of electrically conductive precipitates through the graphite layer having a particularly low volume resistivity, and a phenomenon in which electric charge moves towards the stainless steel base member (a charge collecting phenomenon) is realized. Namely, as long as graphite-based carbon having high crystallinity which is present on the surface of a separator according to the present invention contacts a gas diffusion electrode layer, electrical contact between the separator and the gas diffusion electrode layer is achieved due to the charge collecting action to the electrically conductive precipitates by this graphite layer.

Therefore, in a fuel cell using a separator obtained from a stainless steel member having a graphite layer, the electrical contact surface between a gas diffusion electrode layer and the separator enormously increases compared to the case in which a graphite layer is not present, and contact between the gas diffusion electrode layer and the separator changes from point contact to a state close to surface contact. In particular, this charge collecting phenomenon becomes marked when using a graphite-based carbon for which d002≤3.390 Angstroms which has a particularly low volume resistivity in the a axis direction, and electrical resistivity becomes extremely low. A separator obtained from a stainless steel member having such a graphite layer exhibits a resistance on its surface portion equivalent to that of gold plating, and it provides cell properties equivalent to those obtained when using a gold-plated separator.

In order to effectively realize the above-described charge collecting phenomenon, the electrical resistance in the direction of the surface of the electrically conductive layer is preferably lower than the electrical resistance of the gas diffusion electrode layer. In this regard, the electrical resistance of a gas diffusion electrode layer expressed as volume resistivity is around 0.08 Ω-cm in the direction within the plane (Japan Automotive Research Laboratory, 2004, "Report on Fuel Cell Automobiles", Chapter 4, Technological Trends-1, page 214, Table 4-1-15). Accordingly, a graphite layer having a C plane spacing of graphite-based carbon of d002≤3.390 Angstroms and having a structure such that the a axis direction of the graphite-based carbon is parallel to the surface has a volume resistivity in the direction parallel to the surface which is sufficiently lower than the volume resistivity of the gas diffusion electrode layer. It is therefore thought that this charge collecting phenomenon can be effectively produced by using a separator comprising a stainless steel member having a graphite layer.

The orientation of the graphite-based carbon in a graphite layer according to the present invention can be found from the ratio I(110)/I(004) of the peak strength of the diffraction line of the (110) atomic plane to the peak strength of the diffraction line of the (004) atomic plane when the peak strength of the diffraction lines of the atomic planes obtained by wide angle x-ray diffraction measurement are compared for the crystals of graphite-based carbon in the graphite layer. If this index I(110)/I(004) is less than 0.1, the graphite-based carbon in the graphite layer is oriented so that the a axis direction is nearly parallel to the surface of the passive film, and it is possible to actively utilize the low volume resistivity (4 to $7 \times 10^{-5}$ Ω-cm) in the a axis direction of the graphite-based carbon, i.e., to effectively realize the charge collecting phenomenon. When the index I(110)/I(004) is less than 0.05, a stainless steel member which can be used to manufacture a separator having particularly excellent electrical properties is obtained.

As explained above, it is thought that a graphite layer can realize a separator having a high conductivity due to the charge collecting phenomenon, but it is thought that the high thermal conductivity of graphite-based carbon also contributes to increasing the electrical conductivity of a separator.

A graphite layer has a higher thermal conductivity than a passive film which is an oxide. It is thought that thermal conductivity of at least 100 W/mK in the direction parallel to the surface of the graphite layer is achieved particularly when the crystallinity of graphite-based carbon in a graphite layer is high and the graphite-based carbon is oriented so that its a axis direction is nearly parallel to the surface of stainless steel.

When using a fuel cell incorporating a separator obtained from a stainless steel member having a graphite layer, it is thought that the charge collecting phenomenon produces a relative increase in current flowing in electrically conductive precipitates. At this time, joule heat is generated in the electrically conductive precipitates, but it is expected that this heat is rapidly dispersed in the graphite layer. Accordingly, an increase in the volume resistivity of the electrically conductive precipitates due to joule heat or an increase in volume resistivity due to degradation of the electrically conductive precipitates caused by heat are suppressed, and hence a decrease in the electrical conductivity of the separator is suppressed.

(2) Corrosion Resistance

Corrosion of graphite-based carbon easily develops in portions where the crystallinity is disordered. Therefore, the higher the crystallinity the more difficult it is for graphite-based carbon to corrode. This means that the higher the crystallinity of graphite-based carbon contained in a graphite layer, the better is the corrosion resistance in either an acidic or an alkaline environment and the lower is a probability of deterioration in performance due to contamination of a MEA film by eluted ions or the like. In particular, a graphite layer containing graphite-based carbon with d002≤3.390 Angstroms effectively functions as a corrosion preventing layer with respect to a stainless steel member. Furthermore, the function of suppressing growth of a passive film on the surface of a stainless steel member is maintained for long periods, so changes in contact resistance with the passage of time do not readily take place.

(3) Plasticity

The plasticity of graphite-based carbon becomes better as the C plane spacing decreases and as it approaches 3.354 Angstroms of the ideal crystal state. Accordingly, graphite-based carbon having a C plane spacing of d002≤3.390 Angstroms has good plasticity, so a surface to be treated is easily coated with graphite-based carbon by rubbing a member having this graphite-based carbon against the surface to be treated.

There are no particular limitations on a method of forming the above-described graphite layer. A dispersion liquid having graphite-based carbon dispersed in a suitable dispersant can be applied to the surface of the stainless steel and the dispersant can be removed by a method such as evaporation, or a film may be formed by a method such as sputtering, plasma CVD, or the like. Among such adhesion methods, from the standpoints of productivity and the properties of the resulting graphite-based carbon, it is preferable to form a graphite layer by sliding adhesion treatment or electrolytic sliding adhesion treatment. Below, these methods will be explained in detail.

(1) Sliding Adhesion Treatment

In sliding adhesion treatment, a member containing graphite-based carbon is made to rub with respect to a surface to be treated, and due to the abrasive action of bumps of surface irregularities of a passive film and electrically conductive precipitates, the graphite-based carbon is shaved off and adhered to the surface of the passive film and preferably to the surface of the electrically conductive precipitates so that the a axis direction is preferentially parallel to the film surface.

Electrically conductive precipitates often protrude from the passive film. For this reason, it is thought that electrically conductive precipitates readily shave off graphite-based carbon. As a result, graphite-based carbon readily accumulates in the periphery of electrically conductive precipitates. Accordingly, with sliding adhesion treatment, it is expected that an electrical connection between the graphite layer and the electrically conductive precipitates can be stably obtained.

The exact structure of a member containing graphite-based carbon is suitably determined in accordance with the specific method of sliding adhesion treatment. Sliding adhesion treatment typically uses a member comprising clump-shaped or rod shaped graphite-based carbon or a clump-shaped or rod-shaped member comprising graphite-based carbon which is held together by a binder such as a resin. The member is pressed directly against the sliding surface of the stainless steel member and relative movement such as reciprocating movement is carried out. Specific examples of this method include carrying out rolling with a rolling mill formed of graphite while applying a back tension, and replacing the cutting tool of a milling machine with a round graphite rod and rotating the graphite while applying a fixed load to carry out adhesion. As an alternative, a surface can be rubbed with a brush having graphite powder adhered thereto, or rubbing may be carried out with a cloth (such as felt) having graphite powder adhering thereto. In this case, graphite powder is a member including graphite-based carbon.

Graphite-based carbon contained in a member including graphite-based carbon is, as stated above, preferably a material close to an ideal state having a small spacing between C planes. The charge collecting phenomenon is more effectively produced when the graphite layer consists only of graphite-based carbon, so the member including graphite-based carbon preferably consists only of graphite-based carbon.

There are no particular limitations on sliding conditions such as the contact pressure, the relative speed, and the contact surface ratio. They can be suitably set so as to form a desired graphite layer while preventing excessive abrasion of a member including graphite-based carbon.

A desired graphite layer means a laminated body in which graphite-based carbon adheres to a passive film on a surface of a stainless steel member so that the a axis direction is preferentially parallel to the film surface. In addition, as stated above, the index $I(110)/I(004)$ for the graphite-based carbon in the graphite layer is preferably less than 0.1 and more preferably less than 0.05.

Examples of factors which should be taken into consideration in setting the sliding conditions are the surface roughness of the stainless steel member, the precipitated state of electrically conductive precipitates on the surface of the stainless steel member, the hardness of the graphite-based carbon, and the thickness and properties of the graphite layer.

Among these factors, in order to increase the adhesion of the graphite layer of the stainless steel member, the surface roughness of the stainless steel member having electrically conductive precipitates is preferably an average surface roughness Ra of at least 0.10 micrometers. There is no particular limitation on an upper limit of the surface roughness of the stainless steel member from the standpoint of adhesion. However, when forming a stainless steel member into the shape of a separator by press forming or the like, the average surface roughness Ra is preferably made at most 1/10 of the sheet thickness so as to reduce the possibility of the occurrence of cracking. When imparting surface roughness by usual pickling, the upper limit on the average surface roughness Ra is 2 to 3 micrometers. A surface roughness of several tens of micrometers can be adequately imparted by roughening with a dull roll. However, excessively high roughness cannot proportionally increase the effect of increasing adhesion, and rather causes problems such as cracking at the time of press forming. Therefore, a roughness of 0.1 to 3 micrometers is sufficient from a practical standpoint.

It is sufficient for this preferable range of the surface roughness to be obtained only by the surface of a steel member corresponding to the surface which contacts a gas diffusion electrode layer when a separator obtained from the stainless steel member is incorporated into a fuel cell.

There are no particular limitations on a method of adjusting a stainless steel member so as to have the above-described surface roughness. A number of examples are as follows:

(1) Surface treatment: Using a known etchant for etching stainless steel such as iron chloride, etching is carried out while setting the etchant concentration, the etching fluid temperature, the etching time, and the like in accordance with the amount of etching.

(2) Grinding with a belt grinder: Surface grinding is carried out using a belt grinder having a grinding powder made of diamonds, silicon carbide, alumina, or the like embedded therein to achieve a prescribed surface roughness.

(3) Controlling the surface roughness by adjusting the surface roughness of rolls for rolling: The roughness of a roll for finishing rolling is adjusted to adjust the surface roughness of a material being rolled.

These treatments for surface roughening are preferably carried out on a stainless steel substrate prior to precipitation of electrically conductive precipitates.

Figure 3:
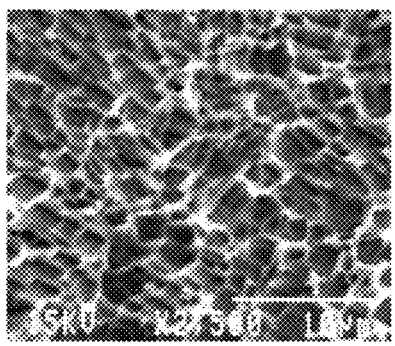
FIG. 3 is a figure schematically showing an example of the manufacturing process according to the present invention.
Figure 3:
Figure 3:
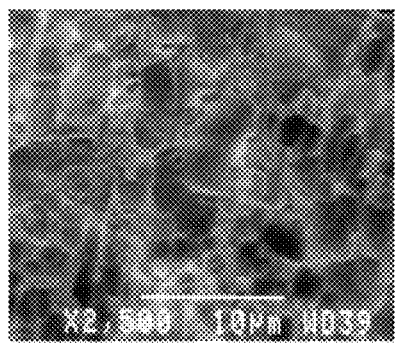
Figure 3:
Figure 3:
Figure 3:
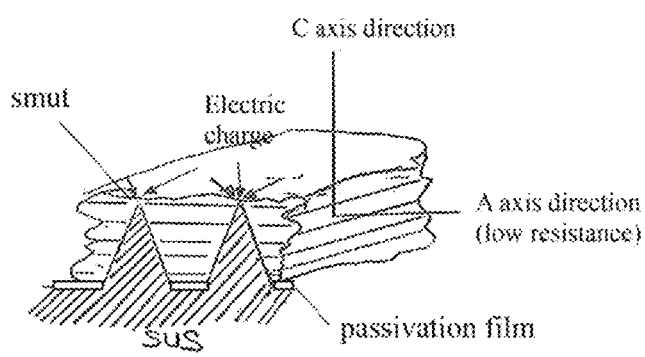

A manufacturing process for a stainless steel member having a graphite layer formed using the above-described sliding adhesion treatment is schematically shown in FIG. 3. The upper portion of FIG. 3 is a SEM image and it shows the result of observation of the surface of a stainless steel member obtained by carrying out surface roughening of a stainless steel substrate followed by precipitation treatment of electrically conductive smut. The middle portion of FIG. 3 is a SEM image showing the result of observation of the surface of a stainless steel member having a graphite layer obtained by carrying out sliding adhesion treatment on a stainless steel member having electrically conductive smut present on its surface. The schematic view in the lower portion of FIG. 3 is a partial cross-sectional view of the surface portion of a stainless steel member having a graphite layer.

Next, a variation of sliding adhesion treatment will be explained.

One usual method of forming a graphite layer other than sliding adhesion treatment is a method in which an electrically conductive paint containing graphite-based carbon is prepared and applied to a surface to be treated. However, this paint is actually a mixture of graphite-based carbon powder and a resin-based binder, and the resin which forms the binder is not electrically conductive. As a result, there is a tendency for the resistivity of the obtained graphite layer to increase compared to when coating is performed only with graphite-based carbon.

Accordingly, in order to realize a contact resistance close to that of gold plating using a graphite layer, it is preferable not to use a resin-based binder when forming a graphite layer. However, if a resin-based binder is used, the graphite layer does not readily fall off a stainless steel member. Therefore, from the standpoint of achieving high productivity, it is preferable to use a resin-based binder.

The below-described method is one method of forming a graphite layer which does not readily drop off a stainless steel material by using a resin-based binder without using an electrically conductive paint.

A resin-based binder by itself is applied to the surface of the stainless steel member having electrically conductive precipitates present on its surface, i.e., to a surface to be treated to form a layer comprising the resin-based binder (referred to below as a resin layer). A graphite layer is then formed by the above-described sliding adhesion treatment.

At this time, a member including graphite-based carbon is made to rub with respect to the surface to be treated having a resin layer formed thereon. As a result, the resin layer is partially peeled off by shear stress caused by the rubbing. The peeled resin layer is thought to accumulate atop the surface to be treated having a resin layer while being mixed with materials which fell off the member containing graphite-based carbon (graphite-based carbon and the like) to form a graphite layer.

Accordingly, the resulting graphite layer is thought to have a structure with a varying composition in which the content of the resin-based binder increases towards the interface with the surface to be treated and the content of graphite-based carbon increases towards the outermost layer. The larger the amount of resin-based binder, the higher the bonding force to other members, while the larger the amount of carbon based graphite the greater is the electrical conductivity. Therefore, it is expected that the contact resistance can be prevented from becoming high even though the resulting graphite layer has a high adhesive strength to the surface to be treated.

Even when employing a method in which such a resin-based binder is previously applied, a coating composition containing graphite-based carbon and at most 2 mass percent of a resin-based binder based on the content of graphite-based carbon is preferably applied to the surface to the treated. If the content of the resin-based binder in the coating composition exceeds 2 mass percent of the content of the graphite-based carbon, the resistance of the electrically conductive layer becomes high, the heat losses caused by resistance of the fuel cell become large, and there is an increased possibility of the electrical output decreasing.

There are no limitations on the type of resin-based binder as long as it is water resistant, oxidation resistant, and has excellent resistance to chemicals. Fluororesin based binders such as PTFE (polytetrafluoroethylene) and PVDF (polyvinylidene fluoride) used in forming catalyst layers for fuel cells are preferred, and among these PTFE is particularly preferred.

(2) Electrolytic sliding Adhesion Treatment

Electrolytic sliding adhesion treatment is a method of simultaneously carrying out electrolysis treatment and sliding adhesion treatment. The specific structure, electrolysis conditions (composition of the electrolyte, conditions of applyed voltage, liquid temperature, and the like), the sliding adhesion conditions (contact pressure, relative speed, specific surface area of contact, and the like), the specific shape and composition of a member including graphite-based carbon, and the like can be suitably set. Here, a concrete example of electrolytic sliding adhesion treatment will be explained based on FIG. 5.

Figure 5:
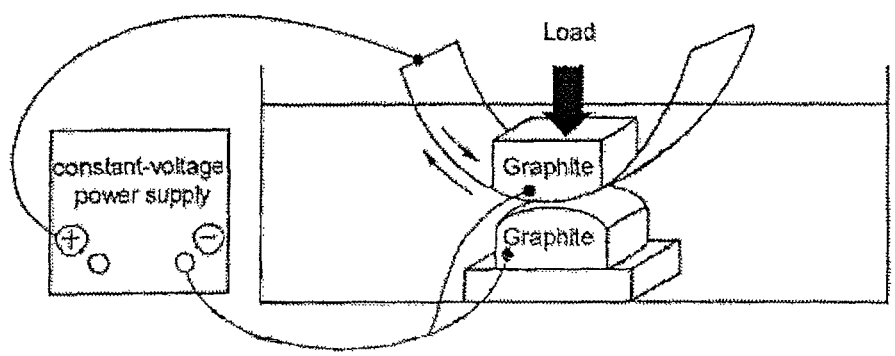
FIG. 5 is a view showing the principles of sulfuric acid electrolysis treatment according to an example.

In the example shown in FIG. 5, two members containing graphite-based carbon (graphite blocks in this example) and a stainless steel substrate (a sheet in this example) are immersed in a sulfuric acid solution, and the sheet is sandwiched between the graphite blocks. Output terminals from a power supply are connected to the graphite blocks. In the present example, the power supply is a direct current power supply, but it may also be an alternating current power supply. While applying a prescribed voltage from the power supply, one graphite block is pressed against the other graphite block, and the sheet is moved back and forth so as to slide with respect to the graphite blocks between which the sheet is disposed.

The applied voltage removes the passive film on the surface of the sheet to expose the stainless steel base metal and causes electrically conductive smut to precipitate on the base metal surface. In addition, a graphite layer is formed by sliding of the graphite blocks and the sheet. The contact resistance with respect to a gas diffusion electrode layer of a separator formed from a stainless steel member having a graphite layer obtained in this manner has a particularly low initial value. The reason why is not certain. It is possibly due to the fact that by simultaneously carrying out electrolysis treatment and sliding adhesion treatment, electrically conductive smut having a large potential difference with respect to the stainless steel member precipitates is easily removed, the graphite layer is rapidly formed atop the precipitated electrically conductive smut and in its periphery so it is difficult for electrically conductive smut to grow, carbon from graphite blocks can become a component of smut, and a graphite layer is directly formed atop the surface of the stainless steel base metal in the acidic solution.

The surface of a stainless steel substrate which is the object of treatment by electrolytic sliding adhesion treatment preferably has an average surface roughness Ra of at least 0.10 micrometers in the same manner as the surface of the stainless steel member which is the object of treatment in sliding adhesion treatment.

EXAMPLES

Below, examples for illustrating the superiority of the present invention will be described.

1. Preparation of a Stainless Steel Sheet (1) Steel Sheet

Four types of usual commercially-available stainless steel sheets 4 were used in the examples. Table 2 shows the composition of these steel sheets. The thickness of the stainless steel sheets was approximately 4 mm or approximately 0.15 mm

TABLE 2

| Type | JIS standard | Chemical composition (mass %, remainder of Fe and impurities) | | | | | | | | |
|---|---|---|---|---|---|---|---|---|---|---|
| | | C | Si | Mn | P | S | Cr | Ni | Mo | Cu |
| Austenitic stainless | SUS301 | 0.06 | 0.4 | 1.6 | 0.02 | 0.015 | 1.71 | 7.1 | — | — |
| | SUS304 | 0.02 | 0.5 | 1.1 | 0.025 | 0.014 | 1.92 | 9.3 | — | — |
| | SUS316L | 0.015 | 0.4 | 1.2 | 0.018 | 0.011 | 1.79 | 12.7 | 2.65 | — |
| Ferritic stainless | SUS430 | 0.07 | 0.48 | 0.78 | 0.012 | 0.021 | 1.75 | 0.32 | — | — |

(2) Adjusting the Surface Roughness

The surface roughness of the stainless steel sheets was adjusted by one of the following methods (A), (B), and (C).

(A) Surface Treatment

Raw materials: Ferric chloride anhydride (manufactured by Wako Pure Chemical Industries, Ltd.), pure water Surface treatment liquid: Aqueous ferric chloride solution with a Baume degree of 45.

Surface treatment conditions: Immersion of a stainless steel sheet for 40 seconds in the treatment liquid at 60° C.

Washing and drying conditions after treatment: After surface treatment, the material being processed was thoroughly washed with running water and then fully dried in an oven at 70° C.

(B) Polishing with a Belt Grinder

Surface polishing of the stainless steel sheet was carried out using a belt grinder having grinding particles embedded in the surface until a prescribed surface roughness was reached.

(c) Control of Surface Roughness by Adjusting the Surface Roughness of Rolls for Rolling Rolls for rolling which varied with respect to surface roughnesses were prepared by varying the degree of finishing in grinding the rolls. The surface roughness of the stainless steel sheets was adjusted by rolling the stainless steel sheets using these rolls.

2. Method of Measuring Contact Resistance

Figure 4:
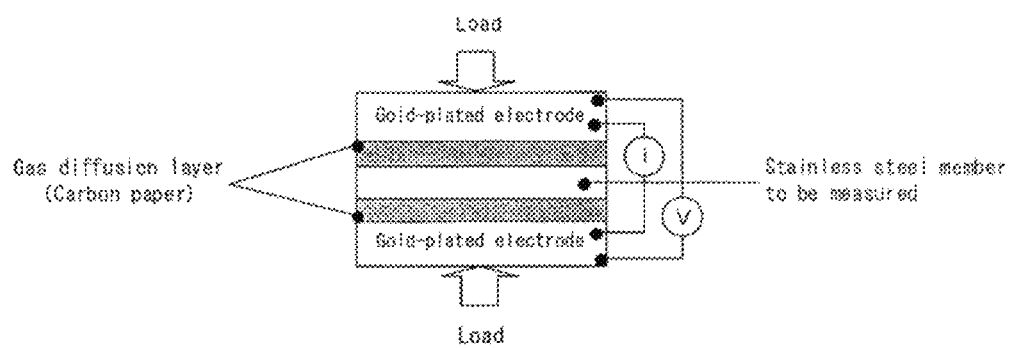
FIG. 4 is a figure showing the principles of measurement of contact resistance according to an example.

Measurement of contact resistance was carried out in accordance with a method reported in treatises or the like (for example, "Titanium", Vol. 54, No. 4, page 259) using the apparatus schematically shown in FIG. 4. A separator sheet was sandwiched between carbon paper (TGP-H-90 manufactured by Toray Industries, Inc.) having an area of 1 cm$^2$ and used as gas diffusion electrode layer, and the above-described layers were sandwiched between gold-plated electrodes. A load (5 kgf/cm$^2$ or 20 kgf/cm$^2$) was applied to the gold-plated electrodes from opposite sides, and then a constant current was passed between the electrodes. The voltage drop which occurred at this time between the carbon paper and the separator sheet was measured, and the contact resistance was measured based on this result. The resulting contact resistance was the total of the contact resistances for both of the sandwiching layers, so this value was divided by 2 to find the contact resistance per side of the gas diffusion electrode layer. Evaluation was carried out using this value.

The current and the voltage drop were measured using a digital multimeter (KEITHLEY 2001 manufacture by Toyo-Technica Co., Ltd.).

3. Investigation of Corrosion Resistance in a Simulated Cell Environment

A sheet for a separator was immersed for 96 hours in $H_2SO_4$ having a pH of 2 at 90° C. The sheet was then thoroughly washed with water and dried, and then the above-described contact resistance measurement was carried out. When the corrosion resistance of the separator sheet was poor, a passive film grew on the surface of the separator sheet, and the contact resistance increased compared to before immersion.

4. Measurement of Spacing Between Planes of Coated Graphite

The interplane spacing of coated graphite was measured by the 2Θ/Θ scan method. In accordance with the GAKUSHIN method 117 (a method of measuring the lattice constant and the size of crystallites of a carbon material (amended proposal) Apr. 7, 2008) using an x-ray diffraction measuring apparatus (RINT 2000 manufactured by Rigaku Corporation), 20 mass percent of standard Si was added so as to carry out baseline correction, profile correction, and the like. Accordingly, an accurate 002 plane spacing (d002), namely, the spacing between C planes was calculated. This calculation employed a carbon material x-ray diffraction data analyzing program Carbon-X Ver1.4.2 manufactured by Realize Science and Engineering Center Co., Ltd.

When coating with graphite was performed by sliding treatment, x-ray diffraction measurement was carried out on the graphite blocks which were used. When painting was employed, x-ray diffraction measurement was carried out on the graphite powder which was used. When graphite-based carbon was coated by vacuum deposition, it was difficult to measure the interplane spacing as is. Therefore, thick vapor deposition was carried out until a clear d002 peak appeared to prepare a sample for XRP measurement, and X-ray diffraction measurement was carried out on this sample.

5. Fuel Cell Evaluation

The solid polymer fuel cell used for evaluation was a modification of a commercial fuel cell, i.e., EFC50 manufactured by ElectroChem, Inc. (USA).

The details of the stainless separator used in the cell were as follows.

Press working was carried out on both surfaces (anode side, cathode side) of a separator sheet prior to surface treatment to obtain the shape shown in FIG. 1 having gas flow passages with a groove width of 2 mm and a groove depth of 1 mm to obtain a separator. The surface treatment described in the examples was then carried out, after which a solid polymer unit cell was assembled using this separator. A unit cell was evaluated in the examples because when multiple cells are stacked up, the results of evaluation are affected by how well stacking is carried out.

Hydrogen gas with a purity of 99.9999% was used as an anode side fuel gas and air was used as a cathode side gas. The entire body of the cell was maintained at 70±−2° C., and humidity control of the interior of the cell was carried out by supplying a gas having a dew point of 70° C. as the cathode side gas. The pressure inside the cell was 1 atmosphere.

The pressure of the hydrogen gas and air introduced into the cell was adjusted to 0.04 to 0.20 bar. Evaluation of cell properties was started in a state in which a unit cell voltage of 0.62±0.04 volts could be ascertained at 0.5 A/cm$^2$, and the cell voltage was constantly measured after that.

The above-described unit cell was evaluated as follows.

(1) Initial Cell Voltage

In evaluating properties, the voltage of the single cell was measured starting from the point at which an output of 0.5 A/cm$^2$ was obtained after supplying fuel gas to the interior of the cell. The highest voltage in the 48 hours after the start of measurement was defined as the initial cell voltage.

(2) Cell Deterioration

Using the cell voltage 500 hours after the initial cell voltage was recorded (output at 0.5 A/cm$^2$), the degree of deterioration of the fuel cell (the rate of decrease of cell voltage per hour) was defined as follows.

Degree of deterioration={cell voltage (V) after 500 hours−initial cell voltage (V)}/500 hours 6. Measurement of Adhesion of Coated Graphite Measurement of the adhesion of the electrically conductive layer formed on the surface of the separator sheet was carried out by a checkerboard tape peeling test in accordance with JIS D 0202-1988. Cellophane tape (CT 24 manufactured by Nichiban Co., Ltd.) was adhered to the electrically conductive layer by pressing with the ball of the finger and then peeled off. Evaluation was based on the number of squares which did not peel off out of 100 squares (10×10). The case in which the electrically conductive layer did not peel off was indicated as 100/100, and the case in which it completely peeled off was indicated as 0/100.

Example 1

The steps in preparing samples for Tests 1 to 9 for evaluating the prior art were as follows.

Test No. 1 (Commercially Available SUS)

This test used the SUS 316L stainless steel sheet shown in Table 2 (thickness of 4 mm). The steel sheet was finished to a prescribed shape of a separator by cutting and discharge machining to obtain a test separator.

Test No. 2 (Gold Plating)

The SUS 316L stainless steel sheet (thickness of 4 mm) shown in Table 2 was formed into the shape of a separator by cutting and discharge machining. The resulting stainless steel sheet having the shape of a separator was subjected to degreasing, washing, surface activation, and washing in that order, and then gold plating was carried out on the surface corresponding to the electrode contact surface of a unit cell (the portion which contacts a gas diffusion electrode layer) using a commercially available potassium gold cyanide solution to obtain a test separator. The thickness of gold plating was 0.05 micrometers.

Test Nos. 3 to 5 (Comparative Example 1 (Based on Patent Document 10))

The method disclosed in Patent Document 10 was performed using the 316L, 304, and 430 stainless steel sheets shown in Table 2 (each having a thickness of 0.15 mm) The surface of the stainless steel sheets was rubbed with felt covered with carbon black having an average particle diameter of approximately 0.05 micrometers. Rolling was then carried out with a reduction of 3% to carry out carbon coating of the surface of the stainless steel sheets. Separators for cell evaluation were obtained by press working to obtain a prescribed shape.

Test No. 6 (Comparative Example 2 (Based on Patent Document 2))

The 430 stainless steel sheet shown in Table 2 (thickness of 0.15 mm) was subjected to a validation test. The stainless steel sheet was formed to a prescribed shape of a separator by press working. The stainless steel sheet having the shape of a separator was then pickled for 10 seconds in a solution containing 10 mass percent of hydrochloric acid at 60° C. A paint was prepared by mixing 100 parts by weight of graphite powder (MCMB manufactured by Osaka Gas Co., Ltd., average particle diameter of 6 micrometers), and 35 parts by weight of a water dispersible paint containing a polyolefin resin and water dispersible carbon black. This paint was applied to a thickness of 30 micrometers on the front and rear surfaces of the stainless steel sheet after pickling, and the sheet was baked at 120° C. for 1 minute to obtain a test separator.

Test No. 7 (Comparative Example 3 (Based on Patent Document 3))

The 304 stainless steel sheet shown in Table 2 (thickness of 0.15 mm) was subjected to press working to obtain a prescribed shape of a separator. A styrene-butadiene copolymer resin (an emulsion of a random copolymer of styrene and butadiene (solids content of 40 percent by weight)) was prepared as a binder. 20 parts by mass of carbon black were mixed with 80 parts by mass of graphite powder (MCMB manufactured by Osaka Gas Co. Ltd., average particle diameter of 6 micrometers) to prepare a powder. 60 parts by mass of the powder comprising carbon black and graphite were mixed with 40 parts by mass of the above-described styrene-butadiene copolymer emulsion, and the mixture was kneaded to form a paint. The resulting paint was applied with a doctor blade to a stainless steel sheet having the shape of a separator. The stainless steel sheet and the paint layer were dried at 150° C. for 15 minutes to obtain a test separator.

Test No. 8 (Comparative Example 4 (Based on Patent Document 4))

The 316L stainless steel sheet shown in Table 2 (thickness of 0.15 mm) was subjected to press working to form the shape of a separator. Using the ion beam vapor deposition method using graphite as a target, amorphous carbon was vapor deposited on the stainless steel sheet having the shape of a separator to obtain a test separator.

Test No. 9 (Comparative Example 5 (Based on Patent Document 5))

An aqueous ferric chloride solution containing 20 g/l of $Fe^{3+}$ at 50° C. was prepared. The 316L stainless steel sheet underwent alternating current electrolysis treatment with an anode current density of 5.0 kA/m$^2$, a cathode current density of 0.2 kA/m$^2$, an alternating current electrolysis cycle of 2.5 kHz, and a treatment time of 60 seconds. After treatment, the stainless steel sheet was formed into the shape of a separator by press working to obtain a test separator.

Test samples according to Test Nos. 10 to 14 were prepared by the following procedures in order to ascertain the effects of the present invention.

First, the four types of stainless steel sheets shown in Table 2 were subjected to cutting and discharge machining to form the separator shapes shown by 5a and 5b in FIG. 1.

Next, the portion of each stainless steel sheet having the shape of a separator which corresponds to the contact portion with a gas diffusion electrode layer was polished with #600 sandpaper. The surface roughness Ra of this portion became approximately 0.25 micrometers.

Next, by one of the following methods, electrically conductive precipitates in the form of electrically conductive smut were formed on the surface of the stainless steel sheet having its surface roughness adjusted.

(A) Sulfuric Acid Treatment

Adjustment was carried out using the sulfuric acid solution by the pickling conditions shown in Table 3.

TABLE 3

| Surface adjustment | Sulfuric acid concentration | Pickling temperature | Time |
|---|---|---|---|
| Surface polishing with #600 sandpaper | 25 vol % | 60° C. | Pickling continued for 30 seconds after formation of brown/black smut observed |

(B) Sulfuric Acid Electrolysis Treatment

Sulfuric acid electrolysis was carried out using a graphite electrode as a cathode and the stainless steel sheet as an anode. The conditions for sulfuric acid electrolysis treatment are shown in Table 4. Electrolysis treatment was started after the stainless steel sheet was immersed for 60 seconds in the solution.

TABLE 4

| Surface adjustment | Solution | Temperature | Voltage | Current density | Time |
|---|---|---|---|---|---|
| Surface polishing with #600 sandpaper | 25 vol % $H_2SO_4$ | 60° C. | 0.5 V | 0.1 A/cm$^2$ | 60 seconds |

One of the stainless steel sheets having electrically conductive precipitates formed in this manner (Test No. 14) was subjected to sliding adhesion treatment using block-shaped graphite (manufactured by Nippon Techno-Carbon Co., Ltd., diameter of 100 mm, d002=3.365 Angstroms) to form a graphite layer on the surface of the sheet.

The results of evaluation of these test members are shown in Table 5.

TABLE 5

| No. | Category | Coating Material | Precipitate carbon | Surface forming method | Surface roughness Ra (μm) | C plane spacing of coating graphite d002 (Å) | Initial contact resistance (mΩ-cm$^2$) 5 kgf/cm$^2$ | Initial contact resistance (mΩ-cm$^2$) 20 kgf/cm$^2$ |
|---|---|---|---|---|---|---|---|---|
| 1 | Commercial SUS | 316 L | — | — | 0.05 | — | 203 | 70 |
| 2 | gold plating | 316 L | — | — | — | — | 9.9 | 2.1 |
| 3 | Comp. 1 | 316 L | Roll. | — | 0.06 | — | 45 | 22 |
| 4 | Comp. 1 | 304 | Roll. | — | 0.04 | — | 51 | 24 |
| 5 | Comp. 1 | 430 | Roll. | — | 0.03 | — | 89 | 38 |
| 6 | Comp. 2 | 316 L | Resin | — | 0.06 | — | 41 | 21 |
| 7 | Comp. 3 | 304 | SBR | — | 0.04 | — | 54 | 21 |
| 8 | Comp. 4 | 316 L | Film | — | 0.05 | — | 45 | 20.5 |
| 9 | Comp. 5 | 316 L | Paint | — | 0.9 | — | 35 | 20.1 |
| 10 | Inv. 1 | 301 | — | Washing | 0.25 | — | 19.4 | 9.4 |
| 11 | Inv. 2 | 304 | — | Electrolysis | 0.26 | — | 19.7 | 9.6 |
| 12 | Inv. 3 | 316 L | — | Electrolysis | 0.24 | — | 19.9 | 9.4 |
| 13 | Inv. 4 | 430 | — | Washing | 0.28 | — | 19.8 | 9.5 |
| 14 | Inv. 5 | 316 L | Graphite | Electrolysis | 0.38 | 3.365 | 10.2 | 3.2 |

| No. | Contact resistance after corrosion test (mΩ-cm$^2$) 5 kgf/cm$^2$ | Contact resistance after corrosion test (mΩ-cm$^2$) 20 kgf/cm$^2$ | Initial cell voltage (V) 0.5 A/cm$^2$ | Initial cell voltage (V) 1.0 A/cm$^2$ | Cell deterioration (μV/hr) | Carbon peeling after 500 hr cell test |
|---|---|---|---|---|---|---|
| 1 | 256 | 95 | 0.58 | 0.23 | not measurable | — |
| 2 | 10.7 | 2.6 | 0.7 | 0.54 | −1.8 | — |
| 3 | 64 | 39 | 0.61 | 0.41 | −5.4 | yes |
| 4 | 78 | 41 | 0.6 | 0.39 | −6.9 | yes |
| 5 | 99 | 57 | 0.58 | 0.37 | −6.9 | yes |
| 6 | 60 | 38 | 0.62 | 0.42 | −5.6 | yes |
| 7 | 123 | 68 | 0.62 | 0.41 | −5.7 | yes |
| 8 | 46 | 21.2 | 0.63 | 0.41 | −3.2 | — |
| 9 | 45 | 22.2 | 0.63 | 0.42 | −3.4 | — |
| 10 | 19.7 | 9.5 | 0.7 | 0.53 | −1.9 | — |

TABLE 5-continued

| | | | | | | |
|---|---|---|---|---|---|---|
| 11 | 19.8 | 9.7 | 0.7 | 0.54 | −1.9 | — |
| 12 | 19.8 | 9.4 | 0.7 | 0.53 | −1.8 | — |
| 13 | 19.7 | 9.6 | 0.7 | 0.53 | −1.9 | — |
| 14 | 10.9 | 3.3 | 0.7 | 0.54 | −1.4 | none |

Notes:
Category:
Comp. = comparative example;
Inv. = example of present invention
Coating carbon:
Roll. = pressure bonding of carbon black by rolling;
Resin = adhesion of carbon black:graphite in 1:1 ratio using a polyolefin resin;
SBR = adhesion of graphite:carbon black in 8:2 ratio using SBR;
Film = carbonaceous film;
paint = application of carbon-dispersed paint after electrolytic etching in ferric chloride;
Graphite = graphite-based carbon
Precipitate forming method:
Washing = sulfuric acid washing;
Electrolysis = sulfuric acid electrolysis
Cell deterioration:
not measurable = the cell deactivated by 100 hours of use and measurement could not be performed The paint in which carbon is dispersed used in Test No. 9 was prepared by adding 10 weight % of carbon black to an acrylic water soluble resin diluted to 10 weight % and fully dispersing the carbon black.

Based on the above results, the effectiveness of the present invention will be explained as follows.

The stainless steel sheets of Examples 1 to 5 of the present invention (Test Nos. 10 to 14) had an initial contact resistance and a contact resistance after a corrosion resistance test which were both less than 20 mΩ-cm$^2$ when a load of 5 kgf/cm$^2$ was applied. Compared to the stainless steel sheets of Test Nos. 1 and 3 to 9 according to the prior art, the initial contact resistance and the contact resistance after a corrosion resistance test were both lower, and hence the stainless steel material according to the present invention had superior corrosion resistance. The stainless steel sheet of Test No. 2 had a low contact resistance, but gold plating is expensive so it has problems with respect to economy and consumption of large amounts of scarce resources.

The stainless steel sheets of Examples 1 to 5 of the present invention (Test Nos. 10 to 14) had an initial cell voltage of 0.7 volts, and the initial cell voltage was higher than for Test Nos. 1 and 3 to 9 of the prior art. The degree of cell deterioration was a good value of higher than −2.0 μV/hour (a value close to 0 μV/hour). Although the stainless steel sheet of Test No. 2 which underwent gold plating also has a good degree of deterioration, it has problems with respect to economy and consumption of large amounts of scarce resources.

When a graphite layer was formed (Example 5 of the present invention), the contact resistance after a corrosion resistance test and the degree of cell deterioration were both greatly improved compared to the conventional method.

Example 2

The following experiment was carried out in order to ascertain a preferred range for the interplane spacing of graphite-based carbon contained in the graphite layer in the present invention.

Small mesophase spheres formed by heat treatment of petroleum pitch and a bulk mesophase which was the matrix of the small spheres were heated to prepare a carbonized carbon material. Graphite-based carbon having various interplane spacings was prepared by varying the heating temperature and time of heat treatment for graphitization of the resulting carbon material.

The heating temperature and time, and the interplane spacing of the resulting graphite-based carbon are shown in Table 6. Carbons 1 to 3 are outside the preferable range of the present invention, and Carbons 4 to 9 are within the preferable range of the present invention.

TABLE 6

| Type | Heating temperature (° C.) | Heating time (hours) | Interplane spacing d002 (Å) |
|---|---|---|---|
| Carbon 1 | 2000 | 0.5 | 3.400 |
| Carbon 2 | 2200 | 0.5 | 3.395 |
| Carbon 3 | 2400 | 0.5 | 3.392 |
| Carbon 4 | 2500 | 1 | 3.385 |
| Carbon 5 | 2600 | 1 | 3.370 |
| Carbon 6 | 2700 | 1 | 3.365 |
| Carbon 7 | 2800 | 1 | 3.362 |
| Carbon 8 | 2900 | 1.5 | 3.360 |
| Carbon 9 | 3000 | 1.5 | 3.356 |

The same treatment as in Test No. 14 of Example 1 (Example 5 of the present invention) was carried out to precipitate electrically conductive smut and a stainless steel sheet having the shape of a separator was obtained. Blocks comprising the nine types of graphite-based carbon shown in Table 6 were rubbed against the portion of the stainless steel member which contacts a gas diffusion electrode layer to obtain test separators having a graphite layer formed on their surfaces. The results of evaluation of these separators are shown in Table 7.

TABLE 7

| No. | Category | Material | Surface roughness Ra (μm) | Method of forming precipitates | Interplane spacing of graphite in coating d002 (Å) | Initial contact resistance (mΩ-cm²) Applied stress of 5 kgf/cm² | Initial contact resistance (mΩ-cm²) Applied stress of 20 kgf/cm² |
|---|---|---|---|---|---|---|---|
| 15 | Inv. 6 | 316 L | 0.37 | Washing | 3.400 | 14.5 | 8.6 |
| 16 | Inv. 7 | 316 L | 0.38 | Electrolysis | 3.390 | 11.3 | 5.8 |
| 17 | Inv. 8 | 316 L | 0.37 | Washing | 3.380 | 11.2 | 5.1 |
| 18 | Inv. 9 | 316 L | 0.35 | Electrolysis | 3.375 | 11.2 | 5.1 |
| 19 | Inv. 10 | 316 L | 0.36 | Washing | 3.370 | 10.4 | 4.1 |
| 14 | Inv. 5 | 316 L | 0.38 | Electrolysis | 3.365 | 10.2 | 3.2 |
| 20 | Inv. 11 | 316 L | 0.35 | Electrolysis | 3.362 | 10 | 3.1 |
| 21 | Inv. 12 | 316 L | 0.37 | Electrolysis | 3.360 | 10 | 3.2 |
| 22 | Inv. 13 | 316 L | 0.36 | Washing | 3.356 | 9.9 | 3.4 |

| No. | Contact resistance after corrosion resistance test (mΩ-cm²) Applied stress of 5 kgf/cm² | Contact resistance after corrosion resistance test (mΩ-cm²) Applied stress of 20 kgf/cm² | Initial cell voltage (V) at 0.5 A/cm² | Initial cell voltage (V) at 1.0 A/cm² | Cell deterioration (μV/hr) | Carbon peeling after 500 hr cell test |
|---|---|---|---|---|---|---|
| 15 | 15.8 | 9.1 | 0.67 | 0.49 | −2.1 | some |
| 16 | 11.5 | 5.9 | 0.68 | 0.51 | −1.6 | none |
| 17 | 12.1 | 5.1 | 0.68 | 0.51 | −1.6 | none |
| 18 | 12.2 | 5.3 | 0.69 | 0.52 | −1.6 | none |
| 19 | 11.1 | 4.1 | 0.69 | 0.53 | −1.6 | none |
| 14 | 10.9 | 3.3 | 0.7 | 0.54 | −1.4 | none |
| 20 | 10.2 | 3.2 | 0.7 | 0.54 | −1.4 | none |
| 21 | 10.4 | 3.1 | 0.7 | 0.54 | −1.3 | none |
| 22 | 10.1 | 3.4 | 0.7 | 0.54 | −1.3 | none |

Notes:
Category:
Inv. = example of the present invention
Method of forming precipitates:
Washing = washing with sulfuric acid;
Electrolysis = sulfuric acid electrolysis A separator made from a 316L stainless steel sheet coated with graphite-based carbon having an interplane spacing exceeding 3.390 Angstroms had a relatively high contact resistance of 15 mΩ-cm² after a corrosion resistance test (contact surface pressure of 20 kgf/cm²), and the degree of cell deterioration was lower than −2.0 μV/hour (it was a more negative value). These results show that the smaller the interplane spacing d002 of graphite-based carbon, the better are the properties.

Based on the above results, a graphite layer containing graphite-based carbon with d002≤3.390 Angstroms for which the cell degradation was higher than −2.0 μm/hour was formed on a stainless steel sheet having electrically conductive precipitates as a preferred mode of the present invention (Examples 5 and 7 to 13 of the present invention).

Example 3

An experiment was carried out in order to ascertain the desired range for the surface roughness of a stainless steel sheet. Materials having various surface roughnesses were obtained by adjusting the abrasive particle roughness of a belt grinder and the etching time with ferric chloride.

The changes in contact resistance and fuel cell properties when the surface roughness was varied are shown in Table 8.

TABLE 8

| No. | Category | Material | Roughening method | Surface roughness Ra (μm) | Method of forming non-metallic conductive substance | Interplane spacing of graphite in coating d002 (Å) | Initial contact resistance (mΩ-cm²) Applied stress of 5 kgf/cm² | Initial contact resistance (mΩ-cm²) Applied stress of 20 kgf/cm² |
|---|---|---|---|---|---|---|---|---|
| 23 | Inv. 15 | 430 | P | 0.08 | Washing | 3.365 | 11.3 | 4.7 |
| 24 | Inv. 16 | 316 L | BG/P | 1.01 | Washing | — | 19.2 | 8.7 |
| 25 | Inv. 17 | 304 | P | 0.15 | Electrolysis | — | 19.6 | 9.8 |
| 26 | Inv. 18 | 316 L | BG | 0.2 | Washing | — | 20.1 | 9.4 |
| 27 | Inv. 19 | 316 L | R | 0.25 | Electrolysis | — | 19.4 | 9.7 |
| 28 | Inv. 20 | 310 | P | 0.25 | Electrolysis | 3.650 | 9.9 | 4.2 |
| 29 | Inv. 21 | 316 L | P | 0.32 | Electrolysis | — | 19.2 | 9.1 |
| 30 | Inv. 22 | 316 L | P | 0.76 | Washing | — | 11.8 | 6.4 |

TABLE 8-continued

| | Contact resistance after corrosion resistance test ($m\Omega \cdot cm^2$) | | Initial cell voltage (V) at 0.5 A/cm² | Initial cell voltage (V) at 1.0 A/cm² | Cell deterioration ($\mu$V/hr) | Carbon peeling after 500 hr cell test |
|---|---|---|---|---|---|---|
| No. | Applied stress of 5 kgf/cm² | Applied stress of 20 kgf/cm² | | | | |
| 23 | 19.5 | 9.8 | 0.7 | 0.53 | −2.1 | some |
| 24 | 19.8 | 10.2 | 0.68 | 0.52 | −1.9 | — |
| 25 | 19.8 | 9.9 | 0.69 | 0.53 | −1.9 | — |
| 26 | 19.6 | 9.5 | 0.69 | 0.53 | −1.9 | — |
| 27 | 19.5 | 9.7 | 0.69 | 0.54 | −1.9 | — |
| 28 | 10.2 | 4.8 | 0.72 | 0.54 | −1.4 | none |
| 29 | 19.4 | 9.2 | 0.69 | 0.54 | −1.7 | — |
| 30 | 12.3 | 6.8 | 0.7 | 0.54 | −1.8 | — |

Notes:
Category:
Inv. = method of the present invention
Surface roughening method:
P = pickling;
BG = belt grinding;
R = rolling with surface roughness adjusting rolls;
BG/P = belt grinding followed by pickling
Method of forming non-metallic conductive substance:
Washing = washing with sulfuric acid;
Electrolysis = sulfuric acid electrolysis When the average surface roughness Ra was smaller than 0.10 micrometers (Example 15 of the present invention), the cell deterioration was somewhat worsened (it was a more negative value). This is thought to be because it was easy for electrically conductive precipitates and/or graphite adhered atop the sheet to peel off.

When the average surface roughness Ra is more than 1.0 micrometers (Example 16 of the present invention), there are no problems with cell performance, but there is the possibility of localized cracking at the time of press forming.

In contrast, when Ra is in the range of 0.10 to 1.0 micrometers, it is possible to obtain particularly good cell properties without concern of cracking during press working.

Example 4

This example evaluated the effects when simultaneously forming electrically conductive smut and a graphite layer by rubbing a stainless steel sheet against graphite-based carbon as a counter electrode during sulfuric acid electrolysis treatment of a stainless steel sheet before forming electrically conductive precipitates on the sheet.

FIG. 5 schematically shows a means for simultaneously carrying out sulfuric acid electrolysis treatment and sliding adhesion treatment.

A stainless steel sheet which had undergone roughening treatment with a belt grinder was used as a member for treatment, and electrically conductive smut and a graphite layer were formed while applying a voltage of 0.4 volts. The results of the above-described evaluation of the resulting stainless steel sheet are shown in Table 9.

TABLE 9

| No. | Category | Material | Surface roughness Ra ($\mu$m) | Method of forming non-metallic conductive precipitate | Interplane spacing of graphite in coating d002 (Å) | Initial contact resistance ($m\Omega \cdot cm^2$) | |
|---|---|---|---|---|---|---|---|
| | | | | | | Applied stress of 5 kgf/cm² | Applied stress of 20 kgf/cm² |
| 31 | Inv. 23 | 316 L | 0.38 | Electrolysis | 3.365 | 9.2 | 3.1 |
| 32 | Inv. 24 | 304 | 0.35 | Electrolysis | 3.365 | 9.4 | 3.1 |

| | Contact resistance after corrosion resistance test ($m\Omega \cdot cm^2$) | | Initial cell voltage (V) at 0.5 A/cm² | Initial cell voltage (V) at 1.0 A/cm² | Cell deterioration ($\mu$V/hr) | Carbon peeling after 500 hr cell test |
|---|---|---|---|---|---|---|
| No. | Applied stress of 5 kgf/cm² | Applied stress of 20 kgf/cm² | | | | |
| 31 | 9.3 | 3.3 | 0.71 | 0.55 | −1.4 | none |
| 32 | 9.5 | 3.2 | 0.71 | 0.55 | −1.4 | none |

Notes:
Category:
Inv. = example of the present invention
Method of forming non-metallic conductive precipitate:
Electrolysis = sulfuric acid electrolysis As shown in Table 9, it was ascertained that the stainless steel members of Test Nos. 31 and 32 obtained in this example had a low contact resistance and in particular a high initial cell voltage.

Example 5

In order to confirm the preferred range in the present invention, as shown in Table 7, specimens were prepared using different methods of forming a graphite layer, and the influence of the orientation of the coated graphite-based carbon was investigated.

The starting material was the SUS 316L stainless steel sheet shown in Table 2. The sulfuric acid treatment shown in Table 3 was performed, and then graphite-based carbon (d002=3.360 Angstroms) was adhered by the various methods shown in Table 10.

For the stainless steel sheets of Test Nos. 35 to 37 and 41 labeled "sliding" in Table 10, a graphite layer was formed by the same method as for the stainless steel sheet of Test No. 14 (Example 5 of the present invention).

For the stainless steel sheet of Test Nos. 33 and 38 labeled "pressing" in Table 10, a graphite layer was formed by placing graphite powder (flaky graphite manufactured by Chuetsu Graphite Works Co., Ltd. with an average particle size of 10 micrometers and an interplane spacing d=3.36 Angstroms) on the portion of a stainless steel sheet corresponding to the contact portion with a gas diffusion electrode layer (SUS 316L) having electrically conductive smut precipitated on its surface and then pressing with a load of 150 kgf/cm$^2$.

For the stainless steel sheet of Test No. 34 labeled "rolling" in Table 10, a graphite layer was formed in the following manner A felt cloth having graphite-based carbon powder adhered thereto or a roll having the cloth wrapped around it was rubbed against a stainless steel sheet (SUS 316L) to adhere graphite-based carbon powder. The stainless steel sheet having graphite-based carbon adhered to it then underwent rolling with a reduction of 2% using a usual roll pair.

For the stainless steel sheets of Test Nos. 39 and 40 labeled "painting" in Table 10, a graphite layer was formed in the following manner. A PTFE dispersion solution (PTFE (polyfuron PTFE dispersion D1) manufactured by Daikin Industries, Ltd.)) diluted to 1/15 strength with pure water was prepared as a binder. This binder was applied to the portion of a stainless steel sheet (SUS 316L) having electrically conductive smut precipitated on its surface corresponding to the contact portion with a gas diffusion electrode layer, and the sheet was then dried. After drying, the surface on which the painted layer was formed was contacted with a graphite block (100 mm on a side with d002=3.36 Angstroms manufactured by Toyo Tanso Co., Ltd.) and sliding was performed.

Wide angle x-ray diffraction measurement of the surface of the stainless separator on which a graphite layer was formed was carried out, and the peak strength of the resulting diffraction lines of the atomic planes were compared. Specifically, the ratio I(110)/I(004) of the peak strength of the diffraction line of the (110) atomic plane with respect to the peak strength of the diffraction line of the (004) atomic plane was used as an index quantitatively showing the orientation of graphite-based carbon crystals in the graphite layer.

The relationship of the orientation to the contact resistance and cell properties is shown in Table 10.

TABLE 10

| No. | Category | Material | Method of coating with graphite | Interplane spacing of graphite in coating d002 (Å) | Orientation I(110)/I(004) | Initial contact resistance (mΩ-cm$^2$) Applied stress of 5 kgf/cm$^2$ | Initial contact resistance (mΩ-cm$^2$) Applied stress of 20 kgf/cm$^2$ | Contact resistance after corrosion resistance test (mΩ-cm$^2$) Applied stress of 5 kgf/cm$^2$ | Contact resistance after corrosion resistance test (mΩ-cm$^2$) Applied stress of 20 kgf/cm$^2$ | Initial cell voltage (V) at 0.5 A/cm$^2$ | Cell deterioration (μV/hr) |
|---|---|---|---|---|---|---|---|---|---|---|---|
| 33 | Inv. 25 | 316 L | Pressing | 3.360 | 0.14 | 22.3 | 10.7 | 22.8 | 10.7 | 0.68 | −1.6 |
| 34 | Inv. 26 | 316 L | Rolling | 3.360 | 0.10 | 20.7 | 8.9 | 21.4 | 9.8 | 0.69 | −1.7 |
| 35 | Inv. 27 | 316 L | Sliding | 3.360 | 0.08 | 17.2 | 4.8 | 18 | 5.4 | 0.71 | −1.5 |
| 36 | Inv. 28 | 316 L | Sliding | 3.360 | 0.05 | 13 | 3.1 | 14.9 | 3.2 | 0.72 | −1.3 |
| 37 | Inv. 29 | 316 L | Sliding | 3.360 | approx. 0 | 12.4 | 2.6 | 13.6 | 2.8 | 0.73 | −1.4 |
| 38 | Inv. 30 | 316 L | Pressing | 3.360 | 0.04 | 14.8 | 7.5 | 17.8 | 7.6 | 0.70 | −1.4 |
| 39 | Inv. 31 | 316 L | Painting | 3.360 | 0.07 | 19.1 | 7.1 | 21.9 | 7.2 | 0.69 | −1.5 |
| 40 | Inv. 32 | 316 L | Painting | 3.360 | 0.03 | 14.9 | 7.5 | 17.7 | 7.1 | 0.71 | −1.4 |
| 41 | Inv. 33 | 316 L | Sliding | 3.360 | 0.01 | 10.8 | 5.1 | 13.8 | 5.2 | 0.72 | −1.3 |

Notes:
Category:
Inv. = example of the present invention

In the present invention, when I(110)/I(004) is less than 0.1, the contact resistance is low, the initial cell voltage increases to at least 0.7 volts, and the amount of cell deterioration is small. In addition, it was confirmed that particularly superior properties are obtained when I(110)/I(004) is less than 0.05.

The invention claimed is:
1. A stainless steel member for a separator for a solid polymer fuel cell, the stainless steel base metal comprising:
   a stainless steel base metal;
   a passive film; and
   smut;
   wherein the passive film, which is a film of an electrically insulating oxide. and the smut are provided on a surface of the stainless steel base metal;
wherein the smut is a substance, originating from the stainless steel base metal, which has precipitated on or adhered to the surface of the stainless steel member as a result of pickling of the stainless steel base metal;
   wherein the smut includes electrically conductive precipitates;
   wherein a thickness of the smut is larger than a thickness of the passive film and the electrically conductive precipitates penetrate the passive film; and wherein the passive film partially covers the smut on a surface of the stainless steel base material.

2. A stainless steel member as set forth in claim 1 wherein the electrically conductive precipitates are a polycrystalline substance containing O, S, Fe, Cr, and C as constituent elements.

3. A stainless steel member as set forth in claim 1 wherein an electrically conductive layer comprising a nonmetallic electrically conductive substance is provided on the surface of the passive film, and the electrically conductive layer is electrically connected to the stainless steel base metal through the electrically conductive precipitates.

4. A stainless steel member as set forth in claim 3 wherein the nonmetallic electrically conductive substance includes graphite-based carbon.

5. A stainless steel member as set forth in claim 4 wherein the graphite-based carbon provided on the surface of the passive film has an interplane spacing d002 of at most 3.390 Angstroms.

6. A stainless steel member as set forth in claim 5 wherein when peak strengths of diffraction lines of atomic planes obtained by wide angle x-ray diffraction measurement of crystals of the graphite-based carbon provided on the surface of the passive film are compared, a ratio of the peak strength of the diffraction line of a (110) atomic plane to the peak strength of the diffraction line of a (004) atomic plane is less than 0.1.

7. A stainless steel member as set forth in claim 4 wherein the electrically conductive layer is formed by rubbing a member containing graphite-based carbon against a surface comprising the surface of the passive film and the surface of the electrically conductive precipitates.

8. A stainless steel member as set forth in claim 7 wherein the average surface roughness Ra of the surface comprising the surface of the passive film and the surface of the electrically conductive precipitates is at least 0.10 micrometers.

9. A stainless steel member as set forth in claim 4 wherein the electrically conductive precipitates and the electrically conductive layer are formed at the same time by performing electrolysis treatment of a stainless steel substrate comprising the stainless steel base metal and the passive film in an acidic solution containing sulfuric acid ions while rubbing a member including graphite-based carbon which functions as a counter electrode in the electrolysis treatment on the member being treated.

10. A stainless steel member as set forth in claim 9 wherein the average surface roughness Ra of the surface of the stainless steel substrate is at least 0.10 micrometers.

11. A solid polymer fuel cell having a separator obtained from a stainless steel member as set forth in claim 1.

* * * * *